United States Patent
Yamahara et al.

[11] Patent Number: 6,084,652
[45] Date of Patent: Jul. 4, 2000

[54] LIQUID CRYSTAL DISPLAY WITH THE PRE-TILT ANGLE SET WITHIN A RANGE THAT GRAY SCALE INVERSION IS PREVENTED

[75] Inventors: Motohiro Yamahara, Osaka; Shigeaki Mizushima, Ikoma, both of Japan

[73] Assignee: Sharp Kabushiki Kaisha, Osaka, Japan

[21] Appl. No.: 09/120,440

[22] Filed: Jul. 22, 1998

[30]    Foreign Application Priority Data

Aug. 29, 1997  [JP]  Japan .................................. 9-235181

[51] Int. Cl.⁷ .......................... G02F 1/141; G02F 1/1335
[52] U.S. Cl. ............................................. 349/136; 349/117
[58] Field of Search ................................. 349/129, 117, 349/118, 136

[56]                References Cited

U.S. PATENT DOCUMENTS

| | | | |
|---|---|---|---|
| 5,434,687 | 7/1995 | Kawata et al. | 349/96 |
| 5,504,603 | 4/1996 | Winker et al. | 359/73 |
| 5,506,706 | 4/1996 | Yamahara et al. | 359/73 |
| 5,589,963 | 12/1996 | Gunning, III et al. | 349/119 |
| 5,604,615 | 2/1997 | Iwagoe et al. | 349/124 |
| 5,619,352 | 4/1997 | Kock et al. | 349/119 |
| 5,652,634 | 7/1997 | Hirata et al. | 349/129 |
| 5,654,784 | 8/1997 | Yasuda et al. | 349/172 |
| 5,657,102 | 8/1997 | Mizushima et al. | 349/124 |
| 5,745,206 | 4/1998 | Koike et al. | 349/129 |
| 5,757,448 | 5/1998 | Takei | 349/92 |
| 5,757,455 | 5/1998 | Sugiyama et al. | 349/129 |
| 5,777,700 | 7/1998 | Kaneko et al. | 349/39 |
| 5,796,456 | 8/1998 | Takator et al. | 349/117 |

FOREIGN PATENT DOCUMENTS

| | | |
|---|---|---|
| 55-600 | 1/1980 | Japan . |
| 56-97318 | 8/1981 | Japan . |
| 57-186735 | 11/1982 | Japan . |
| 5-313159 | 11/1993 | Japan . |
| 6-118406 | 4/1994 | Japan . |
| 6-194645 | 7/1994 | Japan . |

*Primary Examiner*—Kenneth Parker
*Assistant Examiner*—Heidi L. Eisenhut
*Attorney, Agent, or Firm*—David G. Conlin; Peter J. Manus; Dike Bronstein Roberts & Cushman, LLP

[57]                ABSTRACT

The present invention has an object to eliminate viewing angle dependency in the upward, downward, and right- and left-hand directions, and compensate for optical retardation according to the viewing angle. The liquid crystal display device is provided with at least one optical retardation compensator plate inserted between a liquid crystal display element and polarizer plates. The liquid crystal display element is composed of a pair of electrode substrates and a liquid crystal layer sealed therebetween. The polarizer plates flank the liquid crystal display element. The optical retardation compensator plate has a negative refractive index anisotropy and an inclining refractive index ellipsoid. The liquid crystal layer is divided unequally into divisions having mutually different orientation directions, and the pretilt angle formed by the orientation films and the major axes of liquid crystal molecules in the liquid crystal layer is set within such a range that tone reversion does not occur in the opposite viewing direction when halftone is being displayed by applying to the liquid crystal a voltage that is close to the threshold voltage for the liquid crystal.

7 Claims, 12 Drawing Sheets

LIQUID CRYSTAL DISPLAY WITH THE PRE-TILT ANGLE SET WITHIN A RANGE THAT GRAY SCALE INVERSION IS PREVENTED

FIELD OF THE INVENTION

The present invention relates to a liquid crystal display device, especially, to a liquid crystal display device with the viewing angle dependency of the display screen abated by a combination of a liquid crystal display element and an optical retardation compensator plate.

BACKGROUND OF THE INVENTION

Conventionally, liquid crystal display devices incorporating nematic liquid crystal display elements have been in widespread use for numeral-segment-type display devices such as watches and calculators, and recently the applications are finding more places with word processors, notebook-type personal computers, liquid crystal televisions mounted in automobiles, etc.

Generally, a liquid crystal display element has a translucent substrate, electrode lines for turning on and off pixels, and other components formed on the substrate. For example, in an active-matrix type liquid crystal display device, active elements, such as thin-film transistors, are formed on the substrate together with the electrode lines as switching means for selectively driving pixel electrodes by which voltages are applied across the liquid crystal. Moreover, in liquid crystal display devices capable of color display, color filter layers having colors such as red, green and blue are provided on the substrate.

Liquid crystal display elements such as the one mentioned above adopt a liquid crystal display mode that is suitably selected depending on the twist angle of the liquid crystal: some of well-known modes are active-driving-type twisted nematic liquid crystal display mode (hereinafter, referred to as the TN mode) and the multiplex-driving-type super-twisted nematic liquid crystal display mode (hereinafter, referred to as the STN mode).

The TN mode displays images by orientating the nematic liquid crystal molecules to a 90°-twisted state so as to direct rays of light along the twisted directions. The STN mode utilizes the fact that the transmittance is allowed to change abruptly in the vicinity of the threshold value of the applied voltage across the liquid crystal by expanding the twist angle of the nematic liquid crystal molecules to not less than 90°.

The problem with the STN mode is that the background of the display screen sustains a peculiar color due to interference between colors because of the use of the birefringence effect of liquid crystal. In order to solve this problem and to provide a proper black-and-white display in the STN mode, the application of an optical retardation compensator plate is considered to be effective. Display modes using the optical retardation compensator plate are mainly classified into two modes, that is, the double layered super-twisted nematic optical-retardation compensation mode (hereinafter, referred to as the DSTN mode) and the film-type optical-retardation compensation mode (hereinafter, referred to as the film-addition mode) wherein a film having optical anisotropy is provided.

The DSTN mode uses a two-layered construction that has a display-use liquid crystal cell and a liquid crystal cell which are orientated with a twist angle in a direction opposite to that of the display-use liquid crystal cell. The film-addition mode uses a construction wherein a film having optical anisotropy is disposed. Here, the film-addition mode is considered to be more prospective from the standpoint of light weight and low costs. Since the application of such an optical-retardation compensation mode can improve black-and-white display characteristics, color STN liquid crystal display devices have been achieved that enable color display by installing color-filter layers in STN-mode display devices.

The TN modes are, on the other hand, classified into the Normally Black mode and the Normally White mode. In the Normally Black mode, a pair of polarizer plates are placed with their polarization directions parallel to each other, and black display is provided in a state where no ON voltage is applied across the liquid crystal layer (OFF state). In the Normally White mode, a pair of polarizer plates are placed with their polarization directions orthogonal to each other, and white display is provided in the OFF state. Here, the Normally White mode is considered to be more prospective from the standpoints of display contrast, color reproducibility, viewing angle dependency, etc.

However, in the TN-mode liquid crystal display device, liquid crystal molecules have a refractive index anisotropy Δn, and are orientated so as to incline to the above and below substrates. For these reasons, the viewing angle dependency increases: i.e., the contrast of displayed images varies depending upon the direction and angle of the viewer.

FIG. 12 schematically shows the cross-sectional construction of a TN liquid crystal display element 31. This state shows liquid crystal molecules 32 slanting upward slightly as a result of application of a voltage for halftone display. In such a liquid crystal display element 31, a linearly polarized ray 35 passing through the surfaces of a pair of substrates 33 and 34 along the normals thereto, and linearly polarized rays 36 and 37 passing through those surfaces not along the normals thereto cross the liquid crystal molecules 32 at different angles. The liquid crystal molecules 32 have a refractive index anisotropy Δn. Therefore, the linearly polarized rays 35, 36 and 37, upon passing through the liquid crystal molecules 32 in different directions, produce ordinary and extraordinary rays. The linearly polarized rays 35, 36 and 37 are converted to elliptically polarized rays according to the phase difference between the ordinary and extraordinary rays, which cause the viewing angle dependency.

In addition, in an actual liquid crystal layer, the liquid crystal molecules 32 show different tilt angles in the vicinity of the midpoint between the substrates 33 and 34 and in the vicinities of the substrates 33 and 34. The liquid crystal molecules 32 are twisted by 90° around the normal.

For those reasons described so far, the linearly polarized rays 35, 36 and 37 passing through the liquid crystal layer are affected by the birefringence effect in various ways depending upon, for example, the directions and the angles thereof, resulting in complex viewing angle dependency.

Such viewing angle dependency can be observed, as examples, in the following situations. If the viewing angle increases from the normal to the display screen in the standard viewing direction, i.e. downward, and exceeds a certain angle, the displayed image has a distinct color (hereinafter, referred to as the coloration phenomenon), or is reversed in black and white (hereinafter, referred to as the tone reversion phenomenon). If the viewing angle increases from the normal in the opposite viewing direction, i.e. upward, the contrast decreases abruptly.

The aforementioned liquid crystal display device has another problem that the effectual range of viewing angle narrows with a larger display screen. When a large liquid crystal display device is viewed from a short distance in the front thereof, the same color may appear different in the uppermost and lowermost parts of the large screen due to the effect of the viewing angle dependency. This is caused by a wider range of viewing angle required to encompass the whole screen surface, which is equivalent to a viewing direction which is increasingly far off center.

To restrain the viewing angle dependency, Japanese Laid-Open Patent Applications No. 55-600/1980 (Tokukaisho 55-600) and No. 56-97318/1981 (Tokukaisho 56-97318) suggest that an optical retardation compensator plate (retardation compensator film) be inserted as an optical element having optical anisotropy between the liquid crystal display element and one of polarizer plates.

According to the method, the elliptically polarized ray converted from a linearly polarized ray by passing through liquid crystal molecules having refractive index anisotropy is directed through the optical retardation compensator plate (s) disposed on the side(s) of the liquid crystal layer having refractive index anisotropy. Hence, the phase difference between the ordinary and extraordinary rays which occurs to the viewing angle are compensated for, and the elliptically polarized ray is converted back to the linearly polarized ray, which enables the restraint of the viewing angle dependency.

Japanese Laid-Open Patent Application No. 5-313159/1993 (Tokukaihei 5-313159), as an example, discloses an optical retardation compensator plate of the above kind having a refractive index ellipsoid with one of the principal refractive indices parallel to the normal to the surface of the optical retardation compensator plate. Nevertheless, this optical retardation compensator plate still cannot satisfactorily restrain the tone reversion phenomenon that occurs when the viewing angle increases in the standard viewing direction.

Hence, Japanese Laid-Open Patent Application No. 6-75116/1994 (Tokukaihei 6-75116) suggests the use of an optical retardation compensator plate having a refractive index ellipsoid with the principal refractive indices inclining to the normal to the surface of the optical retardation compensator plate. This method adopts two kinds of optical retardation compensator plates as follows.

One of the optical retardation compensator plates has such a refractive index ellipsoid that the smallest of the three principal refractive indices is parallel to the surface, one of the two larger principal refractive indices inclines to the surface of the optical retardation compensator plate by an angle $\theta$, the remaining principal refractive index inclines to the normal to the optical retardation compensator plate by the same angle $\theta$, and the angle $\theta$ satisfies $20° \leq \theta \leq 70°$.

The other optical retardation compensator plate has a refractive index ellipsoid inclining to the surface, where the three principal refractive indices, na, nb, and nc, are mutually related by the inequality na=nc>nb, and the direction of the principal refractive index nb parallel to the normal to the surface and the direction of either the principal refractive index na or nc in the surface recline either clockwise or counterclockwise around the direction of the principal refractive index nc or na in the surface.

As for the former optical retardation compensator plate, a uniaxial and biaxial optical retardation compensator plate can be used. For the latter one, two optical retardation compensator plates, instead of one, can be used in such a combination that the two principal refractive indices nb form an angle of 90°.

A liquid crystal display device, incorporating at least one such optical retardation compensator plate having an inclining refractive index ellipsoid between the liquid crystal display element and the polarizer plate, exhibits some restraint in the contrast variations, coloration phenomenon, and tone reversion phenomenon caused by the viewing angle dependency of the display screen, in comparison with incorporation of an optical retardation compensator plate having a refractive index ellipsoid with the principal refractive index not inclining to the normal of the surface.

In order to eliminate the tone reversion phenomenon, Japanese Laid-Open Patent Application No. 57-186735/1982 (Tokukaisho 57-186835) discloses the so-called pixel dividing method, in which a displayed pattern (pixel) is divided and orientation is controlled so that each divided segment has its own viewing angle characteristics independent from those of the other segments. According to the method, since the liquid crystal molecules stand upwards in different directions from segment to segment, the viewing angle dependency when viewed upward or downward can be eliminated.

Japanese Laid-Open Patent Applications No. 6-118406/1994 (Tokukaihei 6-118406) and No. 6-194645/1994 (Tokukaihei 6-194645) disclose technologies to combine the pixel dividing method and an optical retardation compensator plate.

The liquid crystal display device disclosed in Japanese Laid-Open Patent Application No. 6-118406/1994 includes an optical anisotropic film (optical retardation compensator plate) interposed between the liquid crystal panel and the polarizer plate to, for example, improve the contrast. The retardation compensator plate (optical retardation compensator plate) disclosed in Japanese Laid-Open Patent Application No. 6-194645/1994 is set to have almost no refractive index anisotropy in a plane parallel to the surface of the retardation compensator plate and to have a smaller refractive index in a plane perpendicular to the surface of the retardation compensator plate than the refractive index in a plane parallel thereto, in order to have a negative refractive index. Therefore, when a voltage is applied, the positive refractive index occurring to the liquid crystal display element is compensated for and viewing angle dependency can be decreased.

However, with today's increasingly large demand on a wider effectual range of viewing angle and superb display quality, a better restraint in the viewing angle dependency is crucial. In this context, the optical retardation compensator plate having an inclining refractive index ellipsoid as disclosed in Japanese Laid-Open Patent Application No. 6-75116/1994 (Tokukaihei 6-75116) does not provide satisfactory solutions and needs to be improved.

The pixel dividing method, introduced to eliminate the tone reversion phenomenon, does eliminate the tone reversion phenomenon when viewed up or down. However, the introduction of the method suffers from disadvantages that the contrast is lowered and causes the black color to appear rather whitish, resulting in a grey view, and that the viewing angle dependency persists when viewed from the right- or left-hand direction.

The above-mentioned application of the pixel h dividing method to the use of this optical retardation compensator plate results in coloration phenomenon when the viewing angle is increased up to 45° in an oblique direction. Also, since adopting liquid crystal display elements of which the pixels are divided equally (into equal volumes), the application has a limited ability in controlling the decrease of the contrast when viewed up or down. The reasons are elaborated below.

The above-mentioned pixel dividing method adopts pixels divided in a ratio of equality, averaging the viewing angle characteristics of TN liquid crystal display elements in the standard viewing direction (the direction in which the display contrast is improved from the normal to the display surface) and in the opposite viewing direction (the direction in which the display contrast is lowered from the normal to the display surface). However, since the real viewing angle characteristics in the standard viewing direction and those in the opposite viewing direction are reversed, it is difficult to uniformly restrain the decrease in contrast in the upward and downward directions by means of the above-mentioned application of the pixel dividing method to the use of an optical retardation compensator plate. Especially, when the viewing angle increases in the standard viewing direction, it is likely that the tone reversion phenomenon occurs and that displayed images are too dark to be decipherable.

SUMMARY OF THE INVENTION

In view of the above problems, the present invention has as objects, on top of the improvement by the compensation effects by the optical retardation compensator plate having an inclining refractive index ellipsoid, to further restrain the viewing angle dependency, and especially, to restrain the reversion phenomenon which occurs when the viewing angle increases in the standard or opposite viewing direction, to substantially uniformly restrain the decrease in contrast and the chances of whitish images displayed in such an event, and to effectively restrain the tone reversion in the opposite viewing direction when halftone is being displayed by applying a voltage that is close to the threshold voltage for the liquid crystal.

In order to accomplish the objects, a liquid crystal display device of a first arrangement in accordance with the present invention includes:

a liquid crystal display element formed by sealing a liquid crystal layer between a pair of substrates each of which has an orientation film;

a pair of polarizers disposed so as to flank the liquid crystal display element; and at least one optical retardation compensator plate disposed between the liquid crystal display element and the polarizers, the optical retardation compensator plate having an inclining refractive index ellipsoid, wherein the orientation film divides the liquid crystal layer in each pixel into a plurality of divisions of mutually different volumes and orientates the divisions in mutually different directions, and the pretilt angle formed by the orientation films and the major axes of liquid crystal molecules in the liquid crystal layer is set within such a range that tone reversion does not occur in the opposite viewing direction when halftone is being displayed by applying to the liquid crystal a voltage that is close to the threshold voltage for the liquid crystal.

According to the first arrangement above, for a case where a linearly polarized ray is converted to an elliptically polarized ray according to the phase difference between the ordinary and extraordinary rays developed from the linearly polarized ray upon the passing through the liquid crystal layer possessing birefringence, the optical retardation compensator plate having an inclining refractive index ellipsoid compensates for the phase difference.

However, the compensation function of this kind still falls short of satisfying the increasing demand for a better restraint in the viewing angle dependency. Bearing that in mind, the inventors of the present invention have conducted further research diligently and found out that the pretilt angle formed by the orientation films and the major axes of liquid crystal molecules in the liquid crystal layer affects the tone reversion in the opposite viewing direction, especially, when halftone is being displayed by applying to the liquid crystal a voltage that is close to the threshold voltage for the liquid crystal, which has led to the completion of the present invention.

With the liquid crystal display device of the first arrangement in accordance with the present invention, the pretilt angle of the liquid crystal layer sealed in the liquid crystal display element is set within such a range that tone reversion does not occur in the opposite viewing direction when halftone is being displayed by applying to the liquid crystal a voltage that is close to the threshold voltage for the liquid crystal. This can eliminate the tone reversion in the opposite viewing direction on a screen displaying halftone, and thereby further restrain the viewing angle dependency of the screen. The contrast variations and coloration are also restrained better than only by the compensation function by the optical retardation compensator plate.

Also with the liquid crystal display device of the first arrangement in accordance with the present invention, the liquid crystal layer is unequally divided into divisions having orientation of mutually different directions.

This eliminates the difference in the contradictory viewing angle characteristics between the standard viewing angle and the opposite viewing angle, modifying the two kinds of viewing angle characteristics to be similar to each other. It thereby becomes possible to substantially uniformly restrain the decrease in contrast and the chances of whitish images displayed which occur when the viewing angle increases in the standard or opposite viewing direction, and especially to display the black color even darker.

The inventors have found that the larger the pretilt angles are, the less likely the tone reversion occurs in the opposite viewing direction when halftone is being displayed by applying to the liquid crystal a voltage that is close to the threshold voltage for the liquid crystal. However, the inventors have also found that too large pretilt angles cause an abrupt decrease in luminance in the standard viewing direction when halftone is being displayed. Thus, the liquid crystal display device of the first arrangement in accordance with the present invention, including all the features of the arrangement above, is preferably characterized in that the pretilt angle is further set within such a range that luminance does not decrease abruptly in the standard viewing direction when halftone is being displayed by applying to the liquid crystal a voltage that is close to the threshold voltage for the liquid crystal. This can restrain the abrupt decrease in luminance in the standard viewing direction when halftone is being displayed.

In order to accomplish the objects, a liquid crystal display device of a second arrangement in accordance with the present invention includes:

a liquid crystal display element formed by sealing a liquid crystal layer between a pair of substrates each of which has an orientation film;

a pair of polarizers disposed so as to flank the liquid crystal display element; and at least one optical retardation compensator plate disposed between the liquid crystal display element and the polarizers, the optical retardation compensator plate having an inclining refractive index ellipsoid, wherein the orientation film divides the liquid crystal layer in each pixel into a plurality of divisions of mutually different volumes and orientates the divisions in mutually different directions, and a value of the applied voltage for displaying halftone obtained by applying to the liquid crystal a voltage that is close to the threshold voltage for the liquid crystal is set within such a range that tone reversion does not occur in the opposite viewing direction when halftone is being displayed.

According to the second arrangement above, similarly to the first arrangement, for a case where a linearly polarized ray is converted to an elliptically polarized ray according to the phase difference between the ordinary and extraordinary rays developed from the linearly polarized ray upon the passing through the liquid crystal layer possessing birefringence, the optical retardation compensator plate having an inclining refractive index ellipsoid compensates for the phase difference.

However, the compensation function of this kind still falls short of satisfying the increasing demand for a better restraint in the viewing angle dependency. Bearing that in mind, the inventors of the present invention have conducted further research diligently and found out that the value of applied voltage for displaying halftone obtained by applying to the liquid crystal a voltage that is close to the threshold voltage for the liquid crystal affects the tone reversion in the opposite viewing direction when halftone is being displayed, which has led to the completion of the present invention.

With the liquid crystal display device of the second arrangement in accordance with the present invention, the value of applied voltage for displaying halftone obtained by applying to the liquid crystal a voltage that is close to the threshold voltage for the liquid crystal is set within such a range that tone reversion does not occur in the opposite viewing direction when halftone is being displayed. This can eliminate the tone reversion in the opposite viewing direction with a screen displaying halftone, and thereby further restrain the viewing angle dependency of the screen. The contrast variations and coloration are also restrained better than only by the compensation function by the optical retardation compensator plate.

Also with the liquid crystal display device of the second arrangement in accordance with the present invention, similarly to the first arrangement, the liquid crystal layer is unequally divided into divisions having orientation of mutually different directions.

This eliminates the difference in the contradictory viewing angle characteristics between the standard viewing angle and the opposite viewing angle, modifying the two kinds of viewing angle characteristics to be similar to each other. It thereby becomes possible to substantially uniformly restrain the decrease in contrast and the chances of whitish images displayed which occur when the viewing angle increases in the standard or opposite viewing direction, and especially to display the black color even darker.

The voltage for displaying halftone is set in the Normally White mode, as an example, by way of the transmittance for the white tone to the transmittance for the OFF state. The inventors have found that the lower the transmittance is, the less likely the tone reversion occurs in the opposite viewing direction when white tone is being displayed. However, the inventors have also found that too low transmittances cause an abrupt decrease in luminance in the standard viewing direction. Thus, the liquid crystal display device of the second arrangement in accordance with the present invention, including all the features of the second arrangement above, is preferably characterized in that the value of applied voltage for displaying halftone obtained by applying to the liquid crystal a voltage that is close to the threshold voltage for the liquid crystal is further set within such a range that luminance does not decrease abruptly in the standard viewing direction when halftone is being displayed. This can restrain the abrupt decrease in luminance in the standard viewing direction when halftone is being displayed.

The present invention will become more fully understood from the detailed description given hereinbelow and the accompanying drawings which are given by way of illustration only, are not in any way intended to limit the scope of the claims of the present invention.

DESCRIPTION OF THE EMBODIMENTS

[First Embodiment]

Referring to FIGS. 1 through 5, the following description will discuss an embodiment in accordance with the present invention.

Figure 1:
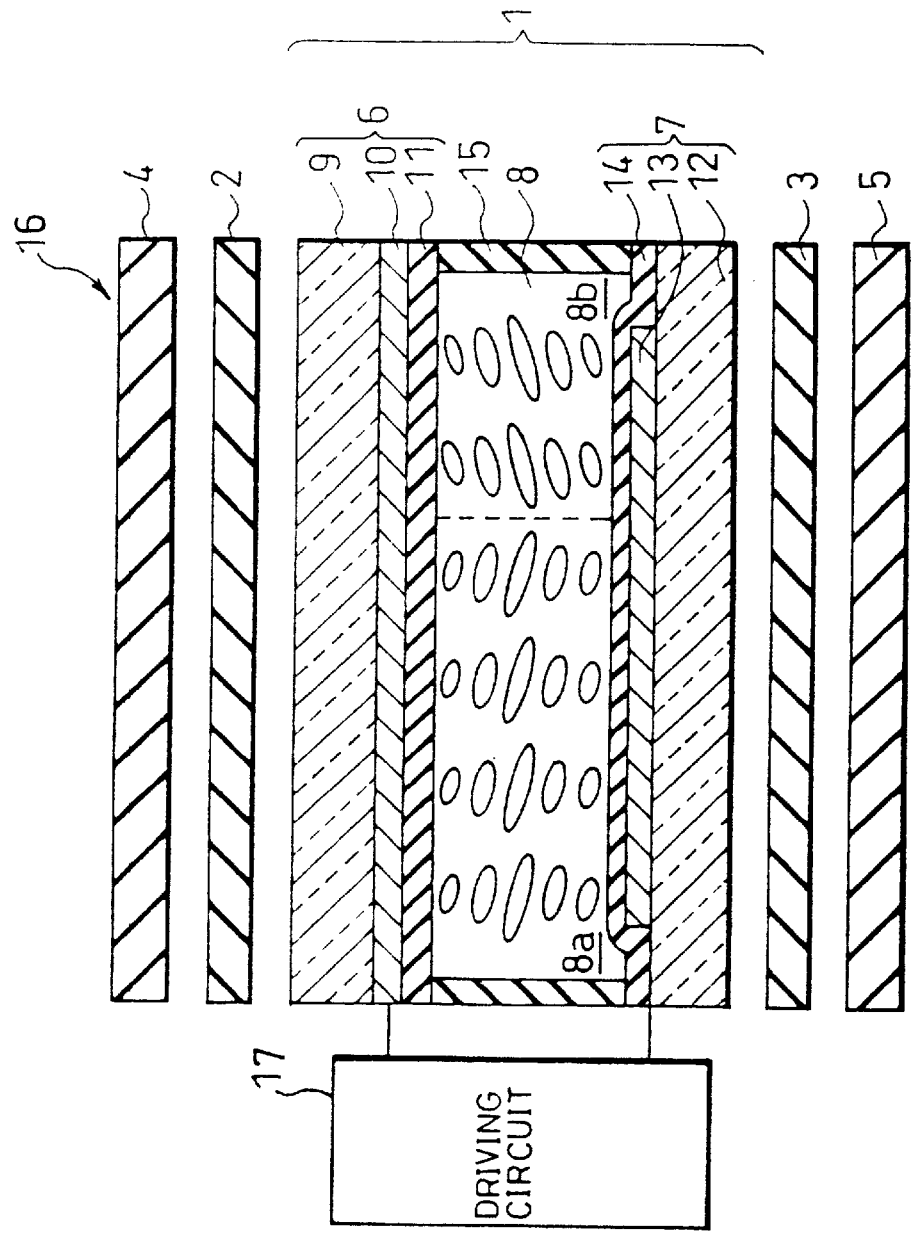
FIG. 1 is a cross-sectional view showing the arrangement of a liquid crystal display device of a first embodiment in accordance with the present invention in a decomposed manner.

As illustrated in FIG. 1, the liquid crystal display device of the present embodiment is provided with a liquid crystal display element 1, a pair of optical retardation compensator plates 2 and 3, and a pair of polarizer plates (polarizers) 4 and 5.

The liquid crystal display element 1 is constituted by electrode substrates 6 and 7 that are placed face to face with each other and a liquid crystal layer 8 that is sandwiched therebetween. The electrode substrate 6 is constructed as follows: a glass substrate (a translucent substrate) 9 is provided as a base; a transparent electrode 10, made of ITO (Indium Tin Oxide), is formed on the surface, of the glass substrate 9, facing the liquid crystal layer 8; and an orientation film 11 is formed on the transparent electrode 10. The electrode substrate 7 is constructed as follows: a glass substrate (a translucent substrate) 12 is provided as a base; a transparent electrode 13, made of ITO, is formed on the surface, of the glass substrate 12, facing the liquid crystal layer 8,; and an orientation film 14 is formed on the transparent electrode 13.

Although FIG. 1 shows a construction corresponding to one pixel for convenience of explanation, the transparent electrodes 10 and 13, which are strip-shaped with a predetermined width, are respectively placed on the glass substrates 9 and 12 with predetermined intervals all over the liquid crystal display element 1, and are designed so that they are orthogonal to each other on the glass substrates 9 and 12, when viewed in a direction perpendicular to the substrate surfaces. Portions at which the transparent electrodes 10 and 13 intersect each other correspond to pixels for carrying out display, and the pixels are placed in a matrix format over the entire structure of the present liquid crystal display device.

The electrode substrates 6 and 7 are bonded by seal resin 15, and a liquid crystal layer 8 is sealed inside the space formed by the seal resin 15 and the electrode substrates 6 and 7. A voltage is applied via the transparent electrodes 10 and 13 by a driving circuit 17 according to display data.

The orientation films 11 and 14 have areas of two different conditions. By means of those areas, the orientation of the liquid crystal molecules in the liquid crystal layer 8 is controlled so as to differ between first divisions (divided liquid crystal layer, first divided liquid crystal layer) 8a and second divisions (divided liquid crystal layer, second divided liquid crystal layer) 8b facing the respective two kinds of areas. The orientation films 11 and 14 produce the different orientation conditions by, for example, providing different pretilt angles to the liquid crystal molecules between the two kinds of areas or providing opposite pretilt directions to the liquid crystal molecules with respect to the normal to the substrate.

Figure 2:
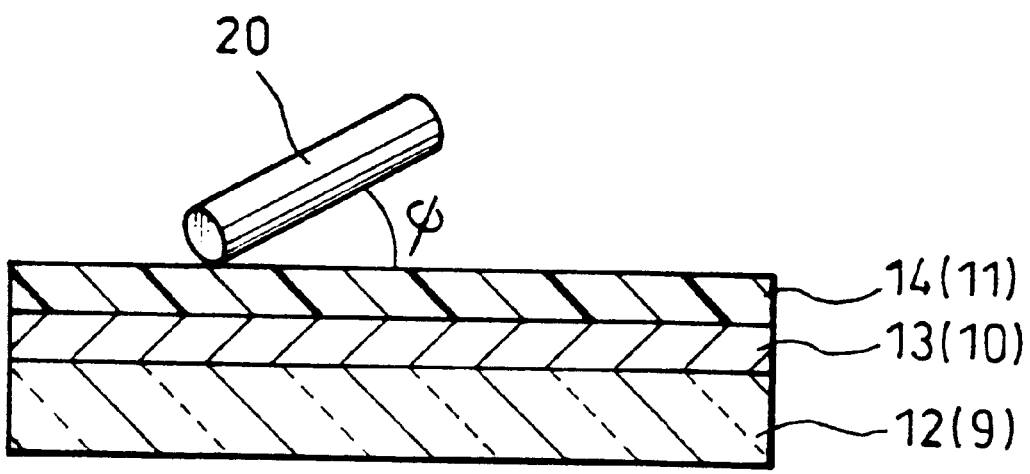
FIG. 2 is an explanatory drawing showing the pretilt angle formed by the major axes of the liquid crystal molecules and the orientation film.

As illustrated in FIG. 2, the pretilt angle is the angle φ formed by the orientation film 14 (11) and the major axes of liquid crystal molecules 20, and determined by the combination of liquid crystal material and rubbing treatment of the orientation films 11 and 14.

In the liquid crystal display device of the present embodiment, in order to improve the viewing angle characteristics when the viewing angle increases in the upward, downward, right-hand, or left-hand direction, the liquid crystal layer 8 is divided unequally, and the pretilt angle of the liquid crystal layer 8 is set so as to produce the best properties when combined with the compensation function for phase difference by the optical retardation compensator plates 2 and 3 (will be described later in detail).

The optical retardation compensator plates 2 and 3 are provided between the liquid crystal display element 1 and the respective polarizer plates 4 and 5 disposed to flank the liquid crystal display element 1. The optical retardation compensator plates 2 and 3 are constituted by a support base made of a transparent organic polymer and discotic liquid crystal. The discotic liquid crystal is treated with an oblique orientation technique or hybrid orientation, and crosslinked. As a result, the optical retardation compensator plates 2 and 3 are formed so as to have a refractive index ellipsoid (will be described later in detail) that inclines to the optical retardation compensator plates 2 and 3.

As for the support base of the optical retardation compensator plates 2 and 3, triacetylcellulose (TAC), which is generally used for polarizer plates, is suitably applied with high reliability. Besides this, colorless, transparent organic polymeric films made of polycarbonate (PC), polyethyleneterephthalate (PET), etc., which are superior in environment resistance and chemical resistance, are also suitably applied.

Figure 3:
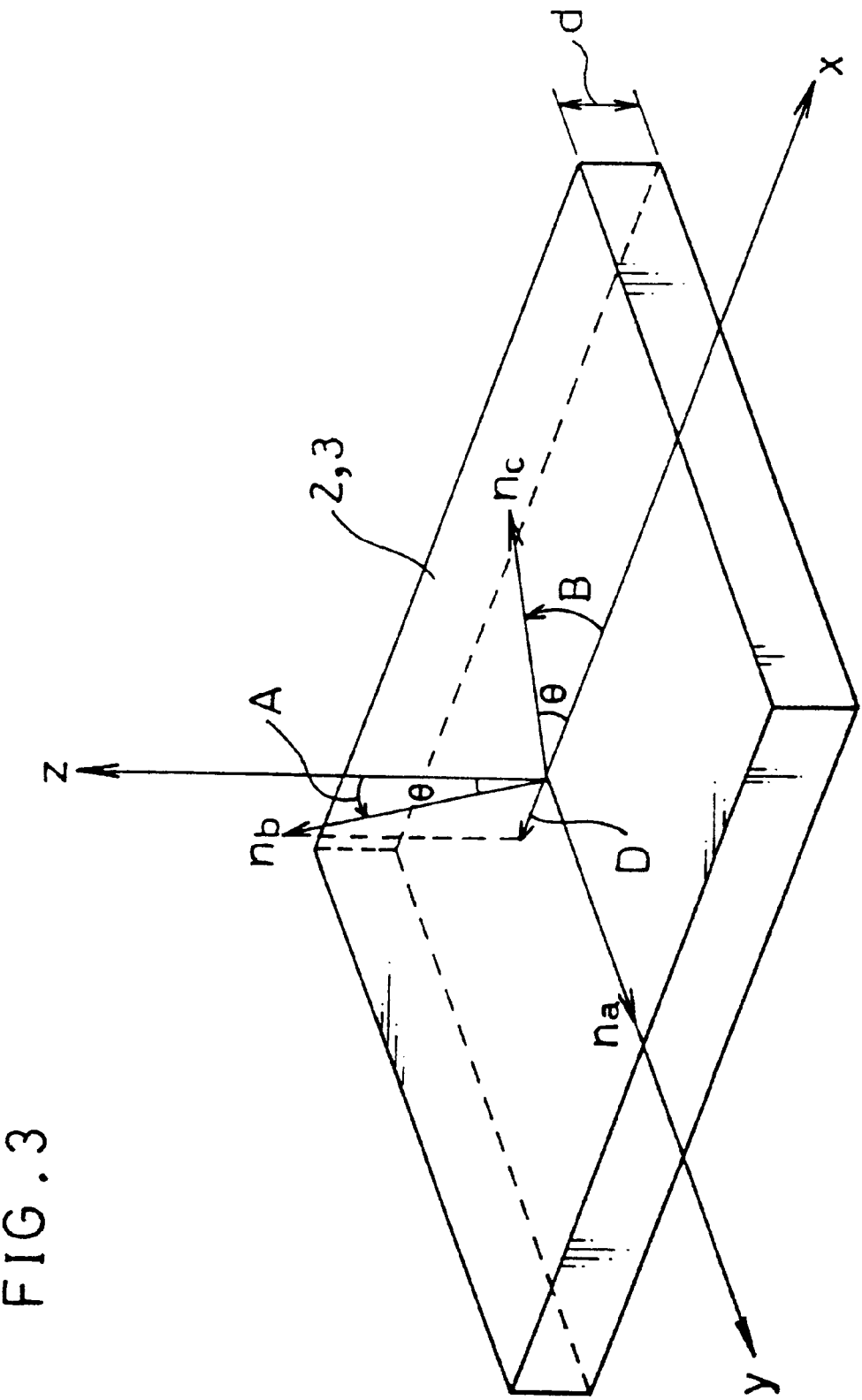
FIG. 3 is a perspective view illustrating the principle refractive indices of an optical retardation compensator plate of the liquid crystal display device.

As illustrated in FIG. 3, each of the optical retardation compensator plates 2 and 3 has principal refractive indices na, nb and nc pointing in three different directions. The direction of the principal refractive index na coincides with the direction of the y-coordinate axis among the mutually orthogonal x-, y-, and z-coordinate axes. The direction of the principal refractive index nb inclines by θ in the direction of arrow A with respect to the z-coordinate axis (parallel to a normal to the surface) that is perpendicular to the surface of the optical retardation compensator plates 2 and 3, which surface corresponds to the screen. The direction of the principal refractive index nc inclines by θ in the direction of arrow B with respect to the x-coordinate axis (the surface).

The principal refractive indices na, nb, and nc of the optical retardation compensator plates 2 and 3 are related to each other by the inequality: na=nc>nb. Therefore, there exists only one optic axis, and the optical retardation compensator plates 2 and 3 have uniaxiality and a negative refractive index anisotropy. The first retardation value, (nc−na)×d, of the optical retardation compensator plates 2 and 3 equals almost 0 nm, since na=nc, while the second retardation value, (nc −nb)×d, is set to an arbitral value in a range from 80 nm to 250 nm. By setting the second retardation value in such a range, the compensation function for phase difference by the optical retardation compensator plates 2 and 3 is surely achieved. Note that (nc−na) and (nc−nb) each represent a refractive index anisotropy Δn, and that d represents the thickness of the optical retardation compensator plates 2 and 3.

In general, in optical anisotropic materials such as liquid crystal and optical retardation compensator plates (phase difference films), the above-mentioned anisotropy of the three-dimensional principal refractive indices na, nc and nb is represented by a refractive index ellipsoid. The refractive-index anisotropy Δn assumes different values depending on the direction from which the refractive index ellipsoid is observed.

The angle θ by which the direction of the principal refractive indices $n_b$ of the optical retardation compensator plates 2 and 3 incline, i.e. the inclination angle θ of the refractive index ellipsoids, is set to an arbitrary value in the range 15°≦θ≦75°. By setting the inclination angle θ to such a value, regardless of whether the refractive index ellipsoids incline clockwise or counterclockwise, the compensation function for phase difference by the optical retardation compensator plates 2 and 3 is surely achieved.

Instead of using the two optical retardation compensator plates 2 and 3, only one of them may be used and disposed on one side. Alternatively, both the optical retardation compensator plates 2 and 3 can be disposed on one side, one of them overlapping the other. As a further alternative, three or more optical retardation compensator plates may be used.

Figure 4:
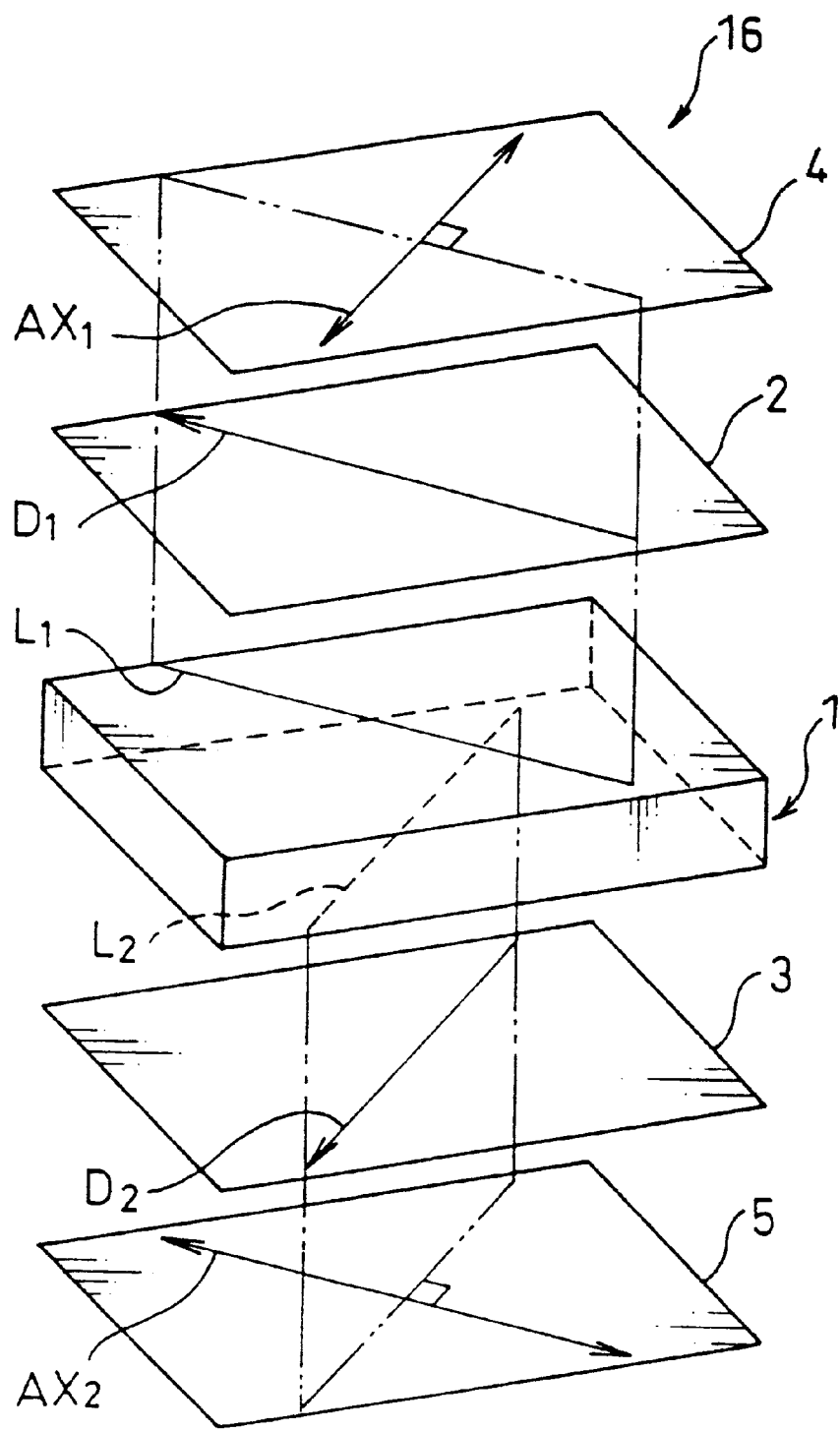
FIG. 4 is a perspective view showing the optical arrangement of a polarizer plate and the optical retardation compensator plate of the liquid crystal display device in a decomposed manner.

As illustrated in FIG. 4, in the present liquid crystal display device, the polarizer plates 4 and 5 in the liquid crystal display element 1 are arranged so that their absorption axes $AX_1$ and $AX_2$ are orthogonal to the major axes $L_1$ and $L_2$ of liquid crystal molecules in contact with the orientation films 11 and 14 respectively (see FIG. 1). In the present liquid crystal display device, since the major axes $L_1$ and $L_2$ are orthogonal to each other, the absorption axes $AX_1$ and $AX_2$ are also orthogonal to each other.

Here, as illustrated in FIG. 3, the direction D is defined as a direction formed by projecting the direction of the principal refractive index nb, which inclines in such a direction to impart anisotropy to the optical retardation compensator plates 2 and 3, onto the surface of the optical retardation compensator plates 2 and 3. As illustrated in FIG. 4, the optical retardation compensator plate 2 is placed so that the direction D (direction $D_1$) is parallel to the major axis $L_1$, and the optical retardation compensator plate 3 is placed so that the direction D (direction $D_2$) is parallel to the major axis $L_2$.

With the above-mentioned arrangement of the optical retardation compensator plates 2 and 3 and the polarizer plates 4 and 5, the present liquid crystal display device can carry out so-called Normally White display wherein rays of light are allowed to pass during OFF time so that white display is provided.

The following description will explain in detail the divisions of the liquid crystal layer 8 and the aforementioned setting of the pretilt angle for the liquid crystal layer 8 that produces the best properties in combination with the compensation function for phase difference by the optical retardation compensator plates 2 and 3 when the divided liquid crystal layer 8 is divided into divisions.

As mentioned above, each pixel of the liquid crystal layer 8 is divided unequally into a first division 8a and a second division 8b to improve the viewing angle characteristics when the viewing angle increases in the upward, downward, right-hand, or left-hand direction. Specifically, the first division 8a and the second division 8b are set to have a ratio ranging from 6:4 to 19:1.

Moreover, the orientation films 11 and 14 orientates the liquid crystal molecules to have perpendicular pretilt directions to the first division 8a and the second division 8b. The pretilt directions $P_1$ and $P_2$ of the orientation film 11 are set in reverse directions between the first division 8a and the second division 8b. Similarly, the pretilt directions $P_3$ and $P_4$ of the orientation film 14 are set in reverse directions between the first division 8a and the second division 8b. Note that the liquid crystal layer 8 may be divided along either the longitudinal direction of the transparent electrode 10 or that of the transparent electrode 13.

The combination of a liquid crystal display element 1 having such a liquid crystal layer 8 with the optical retardation compensator plates 2 and 3 can produce a proper orientation state to the viewing angle characteristics in the standard viewing direction and those in the opposite viewing direction. This can restrain the decrease in contrast and chances of whitish images displayed when the viewing angle increases in the upward or downward direction. As a result, especially, it becomes possible to display the black color which is highly susceptible to the decrease in contrast even darker.

Moreover, in the liquid crystal display element 1, the first division 8a, which is the largest division in a pixel of the liquid crystal layer 8, is preferably set so that the inclination direction of the refractive index ellipsoid with respect to the optical retardation compensator plates 2 and 3 is opposite to the pretilt direction of the liquid crystal molecules placed in the neighborhood of the orientation films 11 and 14.

This allows the optical retardation compensator plates 2 and 3 to compensate for the imbalance of the optical properties caused by the liquid crystal molecules that still incline due to effect of the orientation when voltage is applied to the liquid crystal display element 1.

Consequently, it becomes possible to restrain the reversion phenomenon which occurs when the viewing angle increases in the standard viewing direction, and hence to display good images free from indecipherable darkness. Also, it becomes possible to restrain the decrease in contrast when the viewing angle increases in the opposite viewing direction, and hence to display good images free from whiteness. It also becomes possible to restrain the reversion phenomenon in the right- and left-hand directions.

Moreover, as mentioned earlier, the pretilt angle of the liquid crystal layer 8 is set to produce the best properties when combined with the compensation function for phase difference by the optical retardation compensator plates 2 and 3.

Specifically, the pretilt angle is set in a range that does not cause tone reversion in the opposite viewing direction in a halftone display state where a voltage that is close to the threshold voltage for the liquid crystal is applied to the liquid crystal. Here, since the Normally White display mode is selected, the halftone display state is close to white color. Hereinafter, the halftone display state close to white color will be referred to as white tone.

It has been confirmed through experiments that the larger the pretilt angles are, the less likely the tone reversion occurs in the opposite viewing direction when white tone is being displayed, whereas too large pretilt angles cause an abrupt decrease in luminance in the standard viewing direction when white tone is being displayed. Thus, the pretilt angle also needs to be set within such a range that luminance does not decrease abruptly in the standard viewing direction when white tone is being displayed.

More specifically, used as materials for the liquid crystal and at least either the orientation film 11 or the orientation film 14 is a combination of orientation film materials and liquid crystal materials that results in a pretilt angle larger than 4° and smaller than 15°. More preferable is a combination of orientation film materials and liquid crystal materials that results in a pretilt angle not smaller than 6° and not larger than 14°. The ranges are common to all the division ratios of the liquid crystal layer 8 mentioned above.

The setting of the pretilt angle on at least either of the opposite sides in a range larger than 4° and smaller than 15° enables the liquid crystal display device to be free from problematic tone reversion in the opposite viewing direction when white tone is being displayed and to be viewed in every direction at the viewing angle of 50° which is typically required for liquid crystal display devices.

Especially, the setting of the pretilt angle in a range not smaller than 6° and not larger than 14° enables the liquid crystal display device to be viewed without tone reversion at all in the opposite viewing direction at the viewing angle of 70° when white tone is being displayed.

Selected as the liquid crystal material for the liquid crystal layer 8 of the liquid crystal display device in accordance with the present invention is a liquid crystal material of which the refractive index anisotropy, $\Delta n(550)$, to light having a wavelength of 550 nm is designed to be within a range larger than 0.060 and smaller than 0.120. More preferably, a liquid crystal material of which the refractive index anisotropy, Δn(550), is designed to be within a range not smaller than 0.070 and not larger than 0.095 is used.

As a result, the decrease in contrast ratio in the opposite viewing direction and the tone reversion phenomenon in the right- and left-hand directions can be further restrained by the compensation function for phase difference by the setting of the pretilt angle in the range above, as well as by the compensation function by the optical retardation compensator plates 2 and 3.

As explained so far, the liquid crystal display device of the present embodiment includes, between the liquid crystal display element 1 and the polarizer plates 4 and 5, the optical retardation compensator plates 2 and 3 each having a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, wherein the liquid crystal layer 8 in each pixel is divided unequally into divisions having different orientation directions, and the pretilt angle of the liquid crystal layer 8 is set within such a range that tone reversion does not occur in the opposite viewing direction when halftone is being displayed by applying to the liquid crystal a voltage that is close to the threshold voltage for the liquid crystal.

Consequently from the compensation function for phase difference that occurs to the liquid crystal display element 1 according to the viewing angle by the optical retardation compensator plates 2 and 3, by the setting of the pretilt angle in such a range to produce the best combination for the compensation function by the optical retardation compensator plates 2 and 3, and also by the divisions of the liquid crystal layer 8, the tone reversion phenomenon that occurs when the viewing angle increases in the upward or downward direction is restrained, and the decrease in contrast and the chances of whitish images displayed in such an event are also restrained. Besides, the tone reversion phenomenon that occurs in the opposite viewing direction according to the viewing angle when white tone (because Normally White display is being adopted) is being displayed can be, above all, effectively restrained, which produces high quality images.

Besides, since the liquid crystal display device of the present embodiment employs as the liquid crystal material for the liquid crystal layer 8 a liquid crystal material of which the refractive index anisotropy, Δn(550), to light having a wavelength of 550, is designed to be within a range larger than 0.060 and smaller than 0.120, the decrease in contrast ratio in the opposite viewing direction and the tone reversion phenomenon in the right- and left-hand directions can be further restrained by the compensation function for phase difference by the setting of the pretilt angle in the range above, as well as by the compensation function by the optical retardation compensator plates 2 and 3.

Note that although the liquid crystal display device of Normally White display has been taken as an example in the description above, the same effects can be obtained with a liquid crystal display device of Normally Black display by achieving compensation function for phase difference by the setting of the pretilt angle within such a range that tone reversion does not occur in the opposite viewing direction when halftone (black tone) is being displayed by applying to the liquid crystal a voltage that is close to the threshold voltage for the liquid crystal, as well as by the compensation function by the optical retardation compensator plates 2 and 3.

Note also that although the liquid crystal display device of a simple matrix method has been taken as an example in the description of the embodiment above, the present invention can be alternatively applied to a liquid crystal display device of an active matrix method using active switching elements such as TFTs.

[Second Embodiment]

Referring to FIG. 1, the following description will discuss another embodiment in accordance with the present invention. Here, for convenience, members of the present embodiment that have the same function as members of the first embodiment, and that are mentioned in the first embodiment are indicated by the same reference numerals and description thereof is omitted.

The liquid crystal display device of the present embodiment is configured almost in the same manner as is the liquid crystal display device of the first embodiment shown in FIG. 1, except the following points:

The liquid crystal display device of the first embodiment includes the liquid crystal layer 8 of which the pretilt angle is set in a range that does not cause tone reversion in the opposite viewing direction in a halftone display state where a voltage that is close to the threshold voltage for the liquid crystal is applied to the liquid crystal layer 8, so as to produce the best properties when combined with the compensation function for phase difference by the optical retardation compensator plates 2 and 3.

The liquid crystal display device of the present embodiment, by contrast, includes a liquid crystal layer 8 such that the value of the applied voltage for displaying halftone obtained by applying to the liquid crystal layer 8 a voltage that is close to the threshold voltage for the liquid crystal is set within such a range that tone reversion does not occur in the opposite viewing direction when halftone is being displayed, so as to produce the best properties when combined with the compensation function for phase difference by the optical retardation compensator plates 2 and 3.

Next, the above differences will be explained in detail.

Since the liquid crystal display device of the present embodiment is of Normally White display, the value of the applied voltage for realizing halftone display state where a voltage that is close to the threshold voltage for the liquid crystal is applied to the liquid crystal, i.e. white tone, is set within such a range that tone reversion does not occur in the opposite viewing direction when that voltage is being applied.

It has been confirmed through experiments that the lower the transmittance when white tone is being displayed is, the less likely the tone reversion occurs in the opposite viewing direction when white tone is being displayed. On the other hand, too low transmittances cause an abrupt decrease in luminance in the standard viewing direction and in the right- and left-hand directions. Thus, the voltage applied to the liquid crystal that determines the transmittance when white tone is being displayed needs to be set also within such a range that luminance does not decrease abruptly in the standard viewing direction and in the right- and left-hand directions when white tone is being displayed.

Specifically, the voltage applied to the liquid crystal when white tone is being displayed is set to derive a transmittance higher than 85% that in the OFF state where the voltage applied to the liquid crystal is zero. In such a case, the voltage applied to the liquid crystal when white tone is being displayed is more preferably set to derive a transmittance in a range not less than 90% and not more than 97% that in the OFF state. The ranges are common to all the division ratios above of the liquid crystal layer 8.

The setting of the voltage applied to the liquid crystal when white tone is being displayed so as to derive a transmittance higher than 85% that in the OFF state enables the liquid crystal display device to be free from problematic tone reversion in the opposite viewing direction when white tone is being displayed and to be viewed in every direction at the viewing angle of 50° which is typically required for liquid crystal display devices.

Especially, the setting of the voltage applied to the liquid crystal when white tone is being displayed so as to derive a transmittance in a range not less than 90% and not more than 97% that in the OFF state enables the liquid crystal display device to be viewed without tone reversion at all in the opposite viewing direction at the viewing angle of 70° when white tone is being displayed.

As explained above, the liquid crystal display device of the present embodiment includes, between the liquid crystal display element 1 and the polarizer plates 4 and 5, the optical retardation compensator plates 2 and 3 each having a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, wherein the liquid crystal layer 8 in each pixel is divided unequally into divisions having different orientation directions, and the value of the applied voltage for realizing halftone display where a voltage that is close to the threshold voltage for the liquid crystal is applied to the liquid crystal is set within such a range that tone reversion does not occur in the opposite viewing direction in the state where that voltage is applied.

Consequently from the compensation function for phase difference that occurs to the liquid crystal display element 1 according to the viewing angle by the optical retardation compensator plates 2 and 3, by the setting of the pretilt angle in such a range to produce the best combination for the compensation function by the optical retardation compensator plates 2 and 3, and also by the divisions of the liquid crystal layer 8, the tone reversion phenomenon that occurs when the viewing angle increases in the upward or downward direction is restrained, and the decrease in contrast and the chances of whitish images displayed in such an event are also restrained. Besides, the tone reversion phenomenon that occurs in the opposite viewing direction according to the viewing angle when white tone (because Normally White display is being adopted) is being displayed can be, above all, effectively restrained, which produces high quality images.

Besides, similarly to the liquid crystal display device of the previous embodiment, by employing as the liquid crystal material for the liquid crystal layer 8 a liquid crystal material of which the refractive index anisotropy, Δn(550), to light having a wavelength of 550 nm is designed to be within a range larger than 0.060 and smaller than 0.120, and more preferably, within a range not smaller than 0.070 and not larger than 0.095, the decrease in contrast ratio in the opposite viewing m direction and the tone reversion phenomenon in the right-and left-hand directions can be further restrained by the compensation function for phase difference by the setting of the voltage applied to the liquid crystal when white tone is being displayed in the range above, as well as by the compensation function by the optical retardation compensator plates 2 and 3.

Note that although the liquid crystal display device of Normally White display has been taken as an example in the description above, the same effects can be obtained with a liquid crystal display device of Normally Black display by achieving compensation function for phase difference by the setting of the voltage to be applied to the liquid crystal for halftone (black tone) display obtained by applying to the liquid crystal a voltage that is close to the threshold voltage for the liquid crystal within such a range that tone reversion does not occur in the opposite viewing direction when halftone is being displayed, as well as by the compensation function by the optical retardation compensator plates 2 and 3.

Note also that similarly to the first embodiment, apart from the liquid crystal display device of a simple matrix method, the present invention can be applied to a liquid crystal display device of an active matrix method using active switching elements such as TFTs.

EXAMPLES

Figure 6:
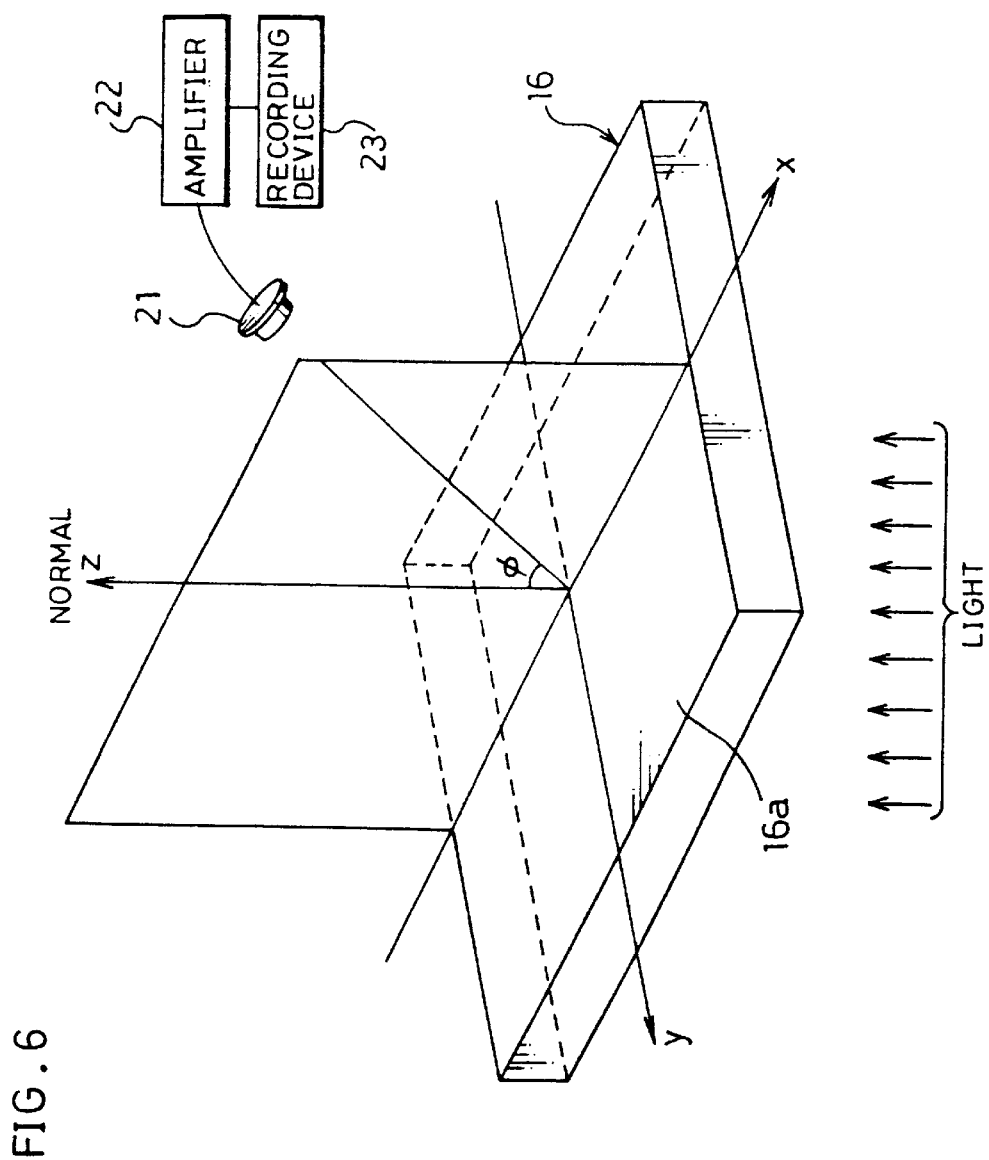
FIG. 6 is a perspective view showing a system for measuring the viewing angle dependency of the liquid crystal display device.

Referring to FIGS. 1, 6, and 11(*a*) to 11(*c*), the following description will explain examples of the liquid crystal display devices of the first and second embodiments in comparison with comparative examples.

First Example

In the present embodiment, viewing angle dependency of the liquid crystal display device was measured by using a measuring system including a light receiving element 21, an amplifier 22, and a recording device 23 as shown in FIG. 6. The liquid crystal cell 16 of the liquid crystal display device is placed so that the surface 16a facing the glass substrate 9 lies on the reference plane X-Y of the rectangular coordinates XYZ. The light receiving element 21 is an element capable of receiving light at a certain solid light receiving angle, and is located a predetermined distance away from the original point of the coordinates at an angle (viewing angle) of $\phi$ with respect to the Z-direction orthogonal to the surface 16a.

Upon measurement, monochromatic light having a wavelength of 550 nm is emitted from the surface opposite the surface 16a to irradiate the liquid crystal cell 16 in the measuring system. Part of the monochromatic light having passed through the liquid crystal cell 16 enters the light receiving element 21. Output by the light receiving element 21 is amplified to a predetermined level by the amplifier 22, and recorded in the recording device 23, such as a waveform memory or a recorder.

Here, three samples #1 to #3 were prepared by using Optomer AL (product name), available from Japan Synthetic Rubber Co., Ltd., as the orientation films 11 and 14 of the liquid crystal cell 16 of the liquid crystal display device shown in FIG. 1, using liquid crystal materials having respective division ratios of the first and second divisions 8a and 8b set to 6:4, 17:3, and 19:1 as the liquid crystal layer 8, and setting the thickness of the cells (of the liquid crystal layers 8) to 5 μm.

Used as the optical retardation compensator plates 2 and 3 of the samples #1 to #3 are those constituted by a transparent support base (e.g., triacetylcellulose (TAC)) on which discotic liquid crystal is applied. The discotic liquid crystal is treated with an oblique orientation technique, and crosslinked. The optical retardation compensator plates 2 and 3 each have resulting first and second retardation values of 0 and 100 nm respectively, a principal refractive index nb inclining by 20° in the direction of arrow A with respect to the z-coordinate axis of the x-, y-, and z-coordinates system, and a principal refractive index nc inclining by 20° in the direction of arrow B with respect to the x-coordinate axis (that is, the inclination angle of the refractive index ellipsoid θ=20°) as shown in FIG. 3.

Here, the samples #1 to #3 were placed in the measuring system shown in FIG. 6, and the output levels by the light receiving element 21 in response to the applying of voltage to the samples #1 to #3 were measured with the light receiving element 21 being fixed at a certain angle φ.

The measurement was done, assuming that the Y-direction points the top side of the screen and the X-direction points the left-hand direction (standard viewing direction) of the screen, while disposing the light receiving element 21 in the upward direction, the downward direction, and the right- and left-hand directions with the angle φ being maintained at 30°. The measurement was also done with the light receiving element 21 placed in the Z-direction.

Figure 7A:
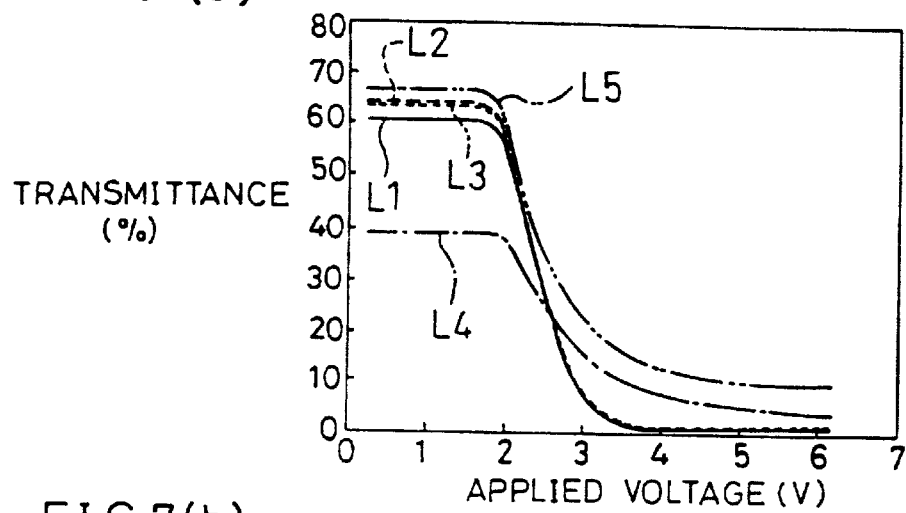
FIGS. 7(a), 7(b), and 7(c) are graphs showing the transmittance versus liquid crystal applied voltage characteristics of the liquid crystal display devices of the first example, FIG. 7(a) showing the case where the orientation division ratio of the liquid crystal layer is 6:4, FIG. 7(b) showing the case where the orientation division ratio of the liquid crystal layer is 17:3, FIG. 7(c) showing the case where the orientation division ratio of the liquid crystal layer is 19:1.
Figure 7B:
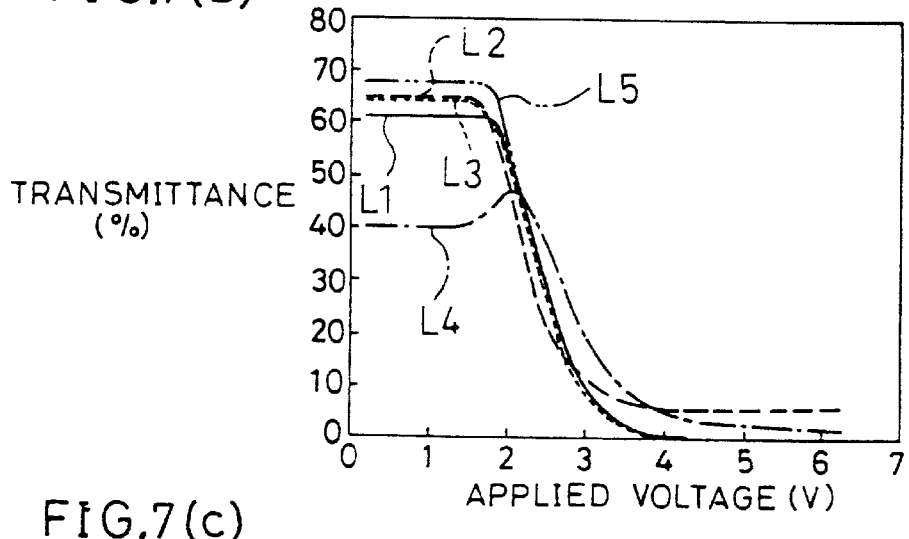
Figure 7C:
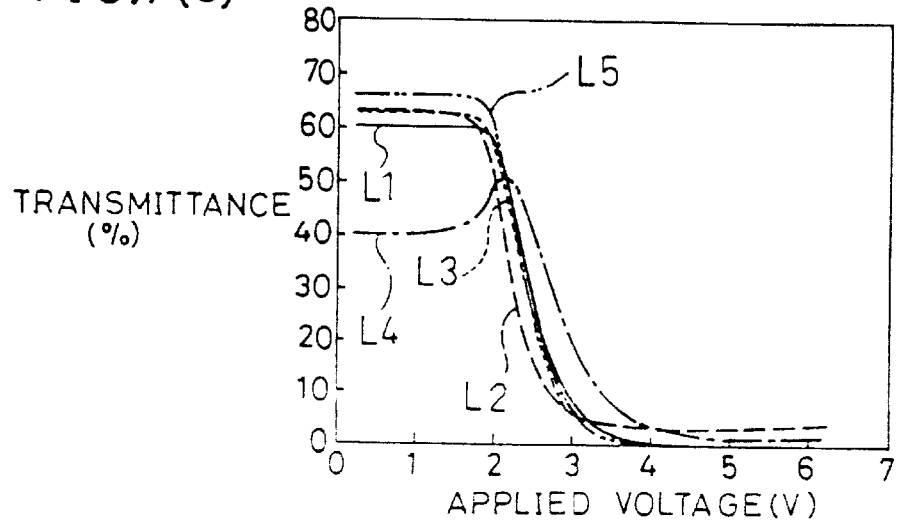

FIGS. 7(a), 7(b), and 7(c) show the results. FIGS. 7(a), 7(b), and 7(c) are graphs showing transmittance of light with respect to the voltage applied to the samples #1 to #3 (the transmittance versus liquid crystal applied voltage characteristics of the samples #1 to #3), FIG. 7(a) showing the results of measurement of the sample #1 having a division ratio of 6:4, FIG. 7(b) showing the results of measurement of the sample #2 having a division ratio of 17:3, FIG. 7(c) showing the results of measurement of the sample #3 having a division ratio of 19:1.

Referring to FIGS. 7(a) to 7(c), the solid curved lines L1 represent the characteristics in the Z-direction, the broken curved lines L2 represent the characteristics in the downward direction, the dotted curved lines L3 represent the characteristics in the right-hand direction, the alternate long and short dashes curved lines L4 represent the characteristics in the upward direction, and the alternate long and two short dashes curved lines L5 represent the characteristics in the left-hand direction.

It was confirmed from FIG. 7(b), illustrating the transmittance versus liquid crystal applied voltage characteristics of the sample #2 having a division ratio of 17:3, that the curved lines L2, L3, L4, and L5 moved closer to the curved line L1 in the halftone display area. Therefore, it was possible to obtain substantially the same viewing angle characteristics in the halftone display area even when the viewing angle increased in the upward, downward, right-hand, or left-hand direction of the screen.

With the measurement in the downward direction, the transmittance stayed as low as about 7% in the ON state, and no tone reversion phenomenon was confirmed. With the measurement in the upward direction, it was confirmed that the transmittance was lower than that measured in the downward direction, and was substantially reduced in the ON state.

The substantially same improvements on the viewing angle characteristics were confirmed with the samples #1 and #3 shown in FIGS. (a) and 7(c).

In particular, as shown in FIG. 7(a), a tendency started to appear at the division ratio of 6:4 that the curved line L2 (downward direction) and the curved line L4 (upward) moved closer toward each other in the halftone display area and in the ON state, and the tendency became more evident with larger division ratios. Meanwhile, as shown in FIG. 7(c), a tendency started to appear at the division ratio of 19:1 that the curved line L2 (downward direction) and the curved line L1 (Z-direction) moved closer toward each other, and the tendency became more evident with smaller division ratios. This restrained the phenomenon for displayed images to be too dark to be decipherable in the downward direction (the standard viewing direction).

Further examination by means of division ratios having smaller increments confirmed that when the division ratio was set in the range from 7:3 to 9:1, e.g. 17:3 as in the aforementioned case, the viewing angle characteristics were improved and became well-balanced between the upward direction and the downward direction.

The liquid crystal display device has the two optical retardation compensator plates 2 and 3 on the sides of the liquid crystal display element 1. However, the viewing angle characteristics above can be obtained by either of the two optical retardation compensator plates 2 and 3. When only one optical retardation compensator plate is used, the viewing angle characteristics in the upward and downward directions are improved and become well-balanced, but those in the right- and left-hand directions are asymmetric. By contrast, when two optical retardation compensator plates ares used, the viewing angle characteristics in the upward and downward directions are improved as in the above case, and in addition those in the right- and left-hand directions are improved and become symmetric as in the upward and downward directions.

Figure 8:
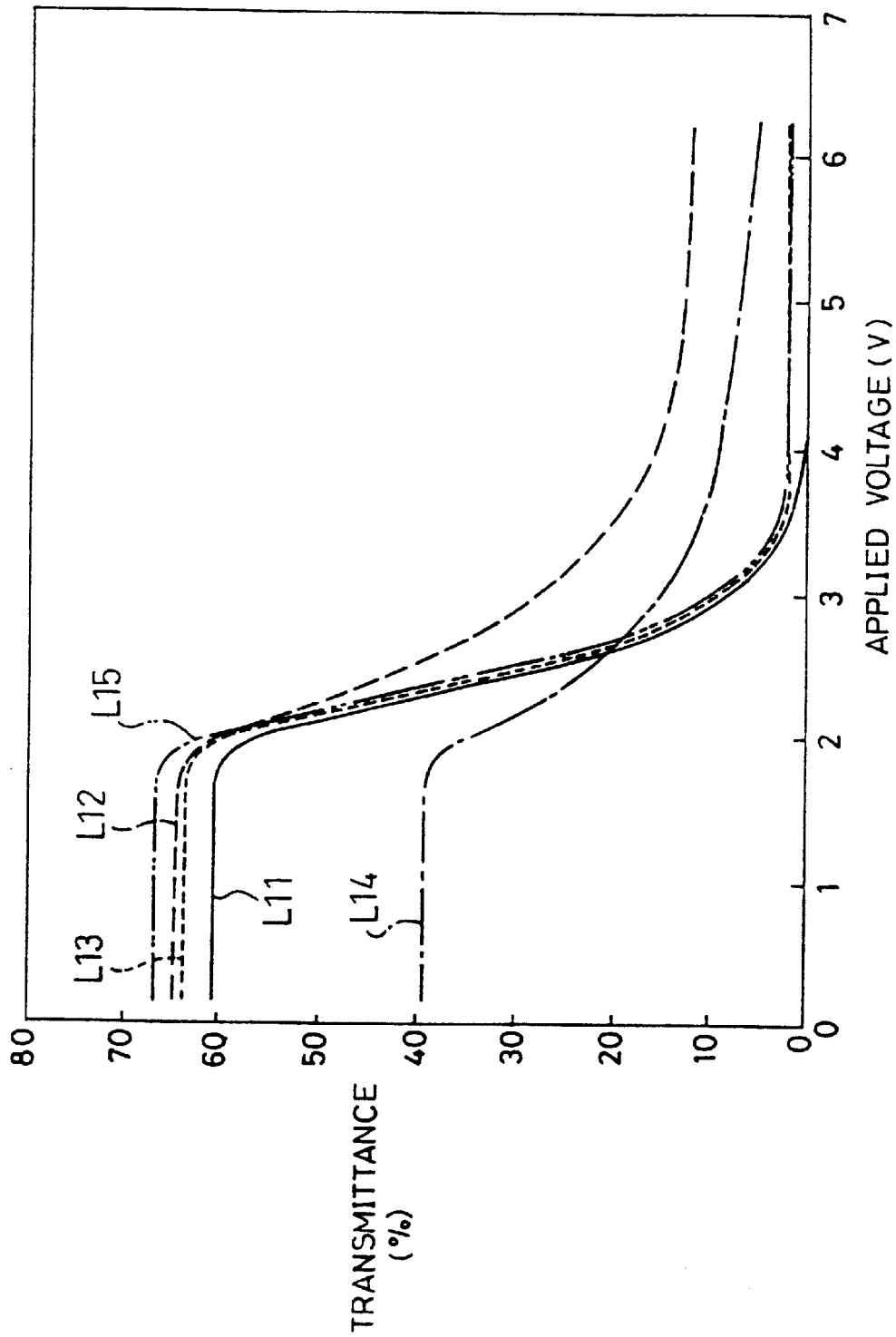
FIG. 8 is a graph showing the transmittance versus liquid crystal applied voltage characteristics of the liquid crystal display device of a comparative example for the first example in a case where the orientation division ratio of the liquid crystal layer is 1:1.

For comparison, a comparative sample #101 was prepared with the division ratio between the first divisions 8a and 8b set to 1:1, and placed in the measuring system shown in FIG. 6 to measure for the viewing angle dependency. The results are shown in FIG. 8 as a graph showing the transmittance versus liquid crystal applied voltage characteristics.

Referring to that graph, the solid curved line L11 represents the characteristics in the Z-direction, the broken curved line L12 represents the characteristics in the downward direction, the dotted curved line L13 represents the characteristics in the right-hand direction, the alternate long and short dashes curved line L14 represents the characteristics in the upward direction, and the alternate long and two short dashes curved line L15 represents the characteristics in the left-hand direction.

It was confirmed from those results that the transmittance was lowered substantially in an ON state in the right- and left-hand directions and that there is no problem with the viewing angle characteristics. It was confirmed that by contrast the transmittance was not lowered substantially in an ON state in the upward and downward directions. The liquid crystal display device of the present comparative example has viewing angle dependency in the upward and downward directions.

Second Example

In the present example, seven sample cells #11 to #17 were prepared by using Optomer AL (product name), available from Japan Synthetic Rubber Co., Ltd., as the orientation films 11 and 14 of the liquid crystal cell 16 of the liquid crystal display device shown in FIG. 1, selecting suitable liquid crystal materials to set the pretilt angles to 2.0°, 4.0°, 6.0°, 8.0°, 14.0°, 15.0°, and 16.0° with respect to the orientation films 11 and 14, and setting the thickness of the cells (of the liquid crystal layers 8) to 5 μm. The first and second divisions 8a and 8b of the liquid crystal layer 8 were set to be 17:3.

Homogeneous cells were prepared by injecting thereinto the materials for the samples #11 to #17, and measured with a pretilt angle measuring device, NSMAP-300LCD (Sigma Optical Machinery Co., Ltd.), for the pretilt angles of the samples #11 to #17.

Used as the optical retardation compensator plates 2 and 3 of the samples #11 to #17 are the optical retardation compensator plates 2 and 3 of the same kind as those in the first example above including discotic liquid crystal treated with an oblique orientation technique.

Tables 1 to 7 show results of visual observations of the sample cells #11 to #17 under white light with various voltages applied for white tone.

TABLE 1

Applied voltage for white tone set to derive a transmittance 100% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | $x_1$ | ○ | ○ | ○ | ○ | ○ | $x_2$ |
| 60° | $x_1$ | ○ | ○ | ○ | ○ | ○ | $x_2$ |
| 70° | $x_1$ | $\Delta_2$ | $\Delta_1$ | ○ | ○ | $x_2$ | $x_2$ |

(In Table 1, "○" represents that no tone reversion was observed in the opposite viewing direction, "$\Delta_1$" represents that no tone reversion was observed in the opposite viewing direction, but that tone is distorted within the extent that did not pose any problem for real use, "$\Delta_2$" represents that tone reversion was observed in the opposite viewing direction within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Supposing that the transmittance along the normal to the surface of the liquid crystal cell 16 is 100% in an OFF state where the voltage applied to the liquid crystal layer is zero, Table 1 shows results of display conditions when white tone is being displayed by setting a value that derives 100% of the transmittance along the normal for each sample.

Table 1 shows that in a case where the voltage when white tone was being displayed was set to cause the transmittance to be 100%, the samples #14 and #15, having respective pretilt angles of 8.0° and 14.0°, displayed high quality images with no tone reversion being observed in the opposite viewing direction at a viewing angle of 70°.

Up to a viewing angle of 60°, the sample #13, having a pretilt angle of 6.0°, had no problems at all and displayed high quality images. At a viewing angle of 70°, tone was distorted, although not reversed, with the sample #13 in the opposite viewing direction only within the extent that did not pose any problem for real use.

Up to a viewing angle of 60°, the sample #12, having a pretilt angle of 4.0°, had no problems at all and displayed high quality images. At a viewing angle of 70°, tone reversion was observed with the sample #12 only within the extent that did not pose any problem for real use.

Up to a viewing angle of 60°, the sample #16 with the pretilt angle of 15.0° displayed high quality images. However, at a viewing angle of 70°, a decrease in luminance was evident in the standard viewing direction to the extent unbearable for real use.

With the sample #11, having a pretilt angle of 2.0°, tone reversion was observed in the opposite viewing direction at a viewing angle as low as 50°. With the sample #17, having a pretilt angle of 16.0°, a decrease in luminance was evident in the standard viewing direction at a viewing angle as low as 50° to the extent unbearable for real use.

TABLE 2

Applied voltage for white tone set to derive a transmittance 97% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | $x_1$ | ○ | ○ | ○ | ○ | ○ | $x_2$ |
| 60° | $x_1$ | $\Delta_1$ | ○ | ○ | ○ | $x_2$ | $x_2$ |
| 70° | $x_1$ | $x_1$ | ○ | ○ | ○ | $x_2$ | $x_2$ |

(In Table 2, "○" represents that no tone reversion was observed in the opposite viewing direction, "$\Delta_1$" represents that no tone reversion was observed in the opposite viewing direction, but that tone is distorted within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 2 shows results observed by setting a voltage for white tone for each sample to cause the transmittance to be 97% that in an OFF state.

Table 2 shows that in a case where the voltage when white tone was being displayed was set to cause the transmittance to be 97%, the samples #13, #14, and #15, having respective pretilt angles of 6.0°, 8.0°, and 14.0°, displayed high quality images with no tone reversion being observed in the opposite viewing direction at a viewing angle of 70°.

Up to a viewing angle of 50°, the sample #12, having a pretilt angle of 4.0°, displayed high quality images with no tone reversion being observed in the opposite viewing direction. At a viewing angle of 60°, tone was distorted with the sample #12. However, the sample #12 did not pose any problem for real use, because tone was not reversed. The sample #16 with the pretilt angle of 15.0° displayed high quality images up to a viewing angle of 50°. However, at a viewing angle of 60°, a decrease in luminance was evident in the standard viewing direction to the extent unbearable for real use.

With the sample #11, having a pretilt angle of 2.0°, tone reversion was observed in the opposite viewing direction at a viewing angle as low as 50°. With the sample #17, having a pretilt angle of 16.0°, a decrease in luminance was evident in the standard viewing direction at a viewing angle as low as 50° to the extent unbearable for real use.

TABLE 3

Applied voltage for white tone set to derive a transmittance 95% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | $x_1$ | ○ | ○ | ○ | ○ | ○ | $x_2$ |
| 60° | $x_1$ | $\Delta_1$ | ○ | ○ | ○ | $x_2$ | $x_2$ |
| 70° | $x_1$ | $x_1$ | ○ | ○ | ○ | $x_2$ | $x_2$ |

(In Table 3, "○" represents that no tone reversion was observed in the opposite viewing direction, "$\Delta_1$" represents that no tone reversion was observed in the opposite viewing direction, but that tone is distorted within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 3 shows results observed by setting a voltage for white tone for each sample to cause the transmittance to be 95% that in an OFF state. Those results were the same as in Table 2 in which the voltage was set to cause the transmittance to be 97%.

TABLE 4

Applied voltage for white tone set to derive a transmittance 92% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | $\Delta_2$ | ○ | ○ | ○ | ○ | ○ | $x_2$ |
| 60° | $x_1$ | ○ | ○ | ○ | ○ | $x_2$ | $x_2$ |
| 70° | $x_1$ | $\Delta_2$ | ○ | ○ | ○ | $x_2$ | $x_2$ |

(In Table 4, "○" represents that no tone reversion was observed in the opposite viewing direction, "$\Delta_2$" represents that tone reversion was observed in the opposite viewing direction within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 4 shows results observed by setting a voltage for white tone for each sample to cause the transmittance to be 92% that in an OFF state.

Table 4 shows that in a case where the voltage when white tone was being displayed was to cause the transmittance to be 92%, the samples #13, #14, and #15, having respective pretilt angles of 6.0°, 8.0°, and 14.0°, displayed high quality images with no tone reversion being observed in the opposite viewing direction at a viewing angle of 70°.

Up to a viewing angle of 60°, the sample #12, having a pretilt angle of 4.0°, displayed high quality images with no tone reversion being observed in the opposite viewing direction. At a viewing angle of 70°, tone was reversed with the sample #12. However, the tone reversion was within the extent that did not pose any problem for real use. The sample #16 with the pretilt angle of 15.0° displayed high quality images up to a viewing angle of 50°. However, at a viewing angle of 60°, a decrease in luminance was evident in the standard viewing direction to the extent unbearable for real use. Tone reversion was observed at a viewing angle of 50° with the sample #11, having a pretilt angle of 2.0°, within the extent that did not pose any problem for real use.

With the sample #17, having a pretilt angle of 16.0°, a decrease in luminance was evident in the standard viewing direction at a viewing angle as low as 50° to the extent unbearable for real use.

TABLE 5

Applied voltage for white tone set to derive a transmittance 90% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | $\Delta_1$ | ○ | ○ | ○ | ○ | $\Delta_3$ | $x_2$ |
| 60° | $\Delta_2$ | ○ | ○ | ○ | $\Delta_3$ | $x_2$ | $x_2$ |
| 70° | $x_1$ | $\Delta_1$ | ○ | ○ | $x_2$ | $x_2$ | $x_2$ |

(In Table 5, "○" represents that no tone reversion was observed in the opposite viewing direction, "$\Delta_1$" represents that no tone reversion was observed in the opposite viewing direction, but that tone is distorted within the extent that did not pose any problem for real use, "$\Delta_2$" represents that tone reversion was observed in the opposite viewing direction within the extent that did not pose any problem for real use, "$\Delta_3$" represents that a decrease in luminance was observed in the standard viewing direction within the extent that did not pose any problem for real use, "$x_1$" represents that tone reversion was observed in the opposite viewing direction, and "$x_2$" represents that a decrease in luminance was evident in the standard viewing direction to the extent unbearable for real use.)

Table 5 shows results observed by setting a voltage for white tone for each sample to cause the transmittance to be 90% that in an OFF state.

Table 5 shows that in a case where the voltage when white tone was being displayed was set to cause the transmittance to be 90%, the samples #13 and #14, having respective pretilt angles of 6.0° and 8.0°, displayed high quality images with no tone reversion being observed in the opposite viewing direction at a viewing angle of 70°.

Up to a viewing angle of 50°, the sample #15, having a pretilt angle of 14.0°, displayed high quality images. At a viewing angle of 60°, a decrease in luminance was observed in the standard viewing direction within the extent that did not pose any problem for real use. Up to a viewing angle of 60°, the sample #12, having a pretilt angle of 4.0°, displayed high quality images with no tone reversion being observed even in the opposite viewing direction. At a viewing angle of 70°, tone was distorted within the extent that did not pose any problem for real use, but no tone reversion was observed. With the sample #16 with the pretilt angle of 15.0°, a decrease in luminance was observed in the standard viewing direction at a viewing angle of 50° within the extent that did not pose any problem for real use. With the sample #11, having a pretilt angle of 2.0°, tone was distorted at a viewing angle of 50° and reversed at a viewing angle of 60° within the extent that did not pose any problem for real use.

With the sample #17, having a pretilt angle of 16.0°, a decrease in luminance was evident in the standard viewing direction at a viewing angle as low as 50° to the extent unbearable for real use.

TABLE 6

Applied voltage for white tone set to derive a transmittance 87% that in the OFF state

| | Pretilt angle (°) | | | | | | |
|---|---|---|---|---|---|---|---|
| Viewing Angle (θ) | 2.0 #11 | 4.0 #12 | 6.0 #13 | 8.0 #14 | 14.0 #15 | 15.0 #16 | 16.0 #17 |
| 50° | ○ | ○ | ○ | ○ | $\Delta_3$ | $x_2$ | $x_2$ |
| 60° | $\Delta_3$ | $\Delta_3$ | $\Delta_3$ | $\Delta_3$ | $\Delta_3$ | $x_2$ | $x_2$ |
| 70° | $x_2$ | $x_2$ | $x_2$ | $x_2$ | $x_2$ | $x_2$ | $x_2$ |

(In Table 6, "○" represents that no tone reversion was observed in the opposite viewing direction, "$\Delta_3$" represents that a decrease in luminance was observed in the standard viewing direction within the extent that did not pose any problem for real use, and "$x_2$" represents that a decrease in luminance was evident in the standard viewing direction to the extent unbearable for real use.)

Table 6 shows results observed by setting a voltage for white tone for each sample to cause the transmittance to be 87% that in an OFF state.

Table 6 shows that in a case where the voltage when white tone was being displayed was set to cause the transmittance to be 87%, the samples #12, #13, and #14, having respective pretilt angles of 4.0°, 6.0° and 8.0°, displayed high quality images up to a viewing angle of 50°. However, at a viewing angle of 60°, a decrease in luminance was observed in the standard viewing direction within the extent that did not pose any problem for real use. At a viewing angle of 70°, a decrease in luminance was evident in the standard viewing direction to the extent unbearable for real use.

At viewing angles of 50° and 60°, a decrease in luminance was observed with the sample #15, having a pretilt angle of 14.0°, in the standard viewing direction within the extent that did not pose any problem for real use. At a viewing angle of 70°, a decrease in luminance was evident in the standard viewing direction to the extent unbearable for real use.

With the samples #16 and #17, having respective pretilt angles of 15.0° and 16.0°, a decrease in luminance was evident in the standard viewing direction at a viewing angle as low as 50° to the extent unbearable for real use.

Up to a viewing angle of 50°, the sample #11, having a pretilt angle of 2.0°, displayed high quality images with no tone reversion being observed in the opposite viewing direction. However, at a viewing angle of 60°, a decrease in luminance was observed in the standard viewing direction within the extent that did not pose any problem for real use. At a viewing angle of 70°, a decrease in luminance was evident in the standard viewing direction to the extent unbearable for real use.

TABLE 7

Applied voltage for white tone set to derive a transmittance 85% that in the OFF state

| Viewing Angle (θ) | Pretilt angle (°) | | | | | | |
|---|---|---|---|---|---|---|---|
| | 2.0 #11 | 4.0 #12 | 6.0 #13 | 8.0 #14 | 14.0 #15 | 15.0 #16 | 16.0 #17 |
| 50° | $\Delta_3$ | $x_3$ | $x_3$ | $x_3$ | $x_3$ | $x_3$ | $x_3$ |
| 60° | $x_3$ | $x_3$ | $x_3$ | $x_3$ | $x_3$ | $x_3$ | $x_3$ |
| 70° | $x_3$ | $x_3$ | $x_3$ | $x_3$ | $x_3$ | $x_3$ | $x_3$ |

(In Table 7, "$\Delta_3$" represents that a decrease in luminance was observed in the standard viewing direction within the extent that did not pose any problem for real use, and "$x_3$" represents that a decrease in luminance was evident in the standard viewing direction and in the right- and left-hand directions to the extent unbearable for real use.)

Table 7 shows results observed by setting a voltage for white tone for each sample to cause the transmittance to be 85% that in an OFF state.

Table 7 shows that in a case where the voltage when white tone was being displayed was set to cause the transmittance to be 85%, a decrease in luminance was evident with the samples #12, #13, #14, #15, #16, and #17, having respective pretilt angles of 4.0°, 6.0° 8.0°, 14.0°, 15.0° and 16.0°, in the standard viewing direction and in the right- and left-hand directions at a viewing angle as low as 50° to the extent unbearable for real use.

At a viewing angle of 50°, a decrease in luminance was observed with the sample #11, having a pretilt angle of 2.0°, in the standard viewing direction within the extent that did not pose any problem for real use. At a viewing angle of 60°, a decrease in luminance was evident in the standard viewing direction to the extent unbearable for real use.

It can be concluded from Tables 1 to 7 that tone reversion can be restrained in the opposite viewing direction by adjusting the pretilt angle or the transmittance when white tone is being displayed. It can be also concluded that in such an event, at a value ranging from 95% to 97% to which the transmittance is normally set as the transmittance for white tone, the setting of the pretilt angle in a range larger than 4° and smaller than 15° permits high quality images to be displayed at a viewing angle of 50° with tone reversion being restrained in the opposite viewing direction and no decrease in luminance being observed in the standard viewing direction. It can be further concluded that the setting of the pretilt angle in a range not less than 6° and not more than 14° permits high quality images to be displayed at a wide viewing angle of 70° with tone reversion being restrained in the opposite viewing direction and no decrease in luminance being observed in the standard viewing direction.

Moreover, it can be concluded that at a pretilt angle of 4° to 14°, to which the pretilt angle is normally set, such setting that a transmittance not higher than 85% is derived as the transmittance when white tone is being displayed permits high quality images to be displayed at a viewing angle of 50° with tone reversion being restrained in the opposite viewing direction and no decrease in luminance being observed in the standard viewing direction. It can be also concluded that such setting that a transmittance within a range not less than 90% and not more than 97% is derived permits high quality images to be displayed at a wide viewing angle of 70° with tone reversion being restrained in the opposite viewing direction and no decrease in luminance being observed in the standard viewing direction.

Moreover, it can be concluded that a combination of the adjustment of the pretilt angle and that of the transmittance when white tone is being displayed further enhances the effects of improvement.

Next, viewing angle dependency of the liquid crystal display device was checked with the same samples #11 and #14 as above by using a measuring system including a light receiving element 21, an amplifier 22, and a recording device 23 as shown in FIG. 6.

In this measuring system, the liquid crystal cell 16 of the liquid crystal display device is placed so that the surface 16a facing the glass substrate 9 lies on the reference plane X-Y of the rectangular coordinates XYZ. The light receiving element 21 is an element capable of receiving light at a certain solid light receiving angle, and is located a predetermined distance away from the original point of the coordinates at an angle (viewing angle) of φ with respect to the Z-direction orthogonal to the surface 16a.

Upon measurement, monochromatic light having a wavelength of 550 nm is emitted from the surface opposite the surface 16a to irradiate the liquid crystal cell 16 in the measuring system. Part of the monochromatic light having passed through the liquid crystal cell 16 enters the light receiving element 21. Output by the light receiving element 21 is amplified to a predetermined level by the amplifier 22, and recorded in the recording device 23, such as a waveform memory or a recorder.

Here, the output level by the light receiving element 21 in response to the applying of voltage to the samples #11 and #14 was measured with the light receiving element 21 being fixed at a certain angle φ.

The measurement was done, assuming that the Y-direction is the left-hand side of the screen and the X-direction is the downward direction (standard viewing direction) of the screen, while disposing the light receiving element 21 in the upward direction (opposite viewing direction), the downward direction (standard viewing direction), and the right- and left-hand directions with the angle φ being maintained at 50°.

Figure 9A:
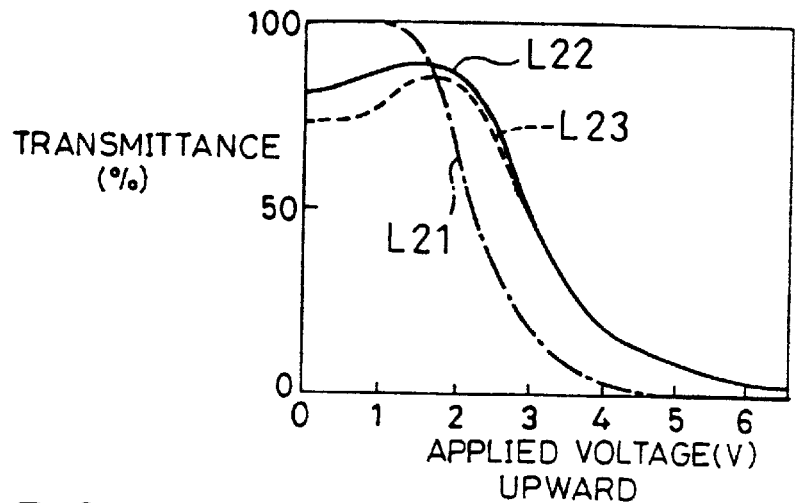
FIGS. 9(a), 9(b), and 9(c) are graphs showing the transmittance versus liquid crystal applied voltage characteristics of the liquid crystal display devices of the second example.
Figure 9B:
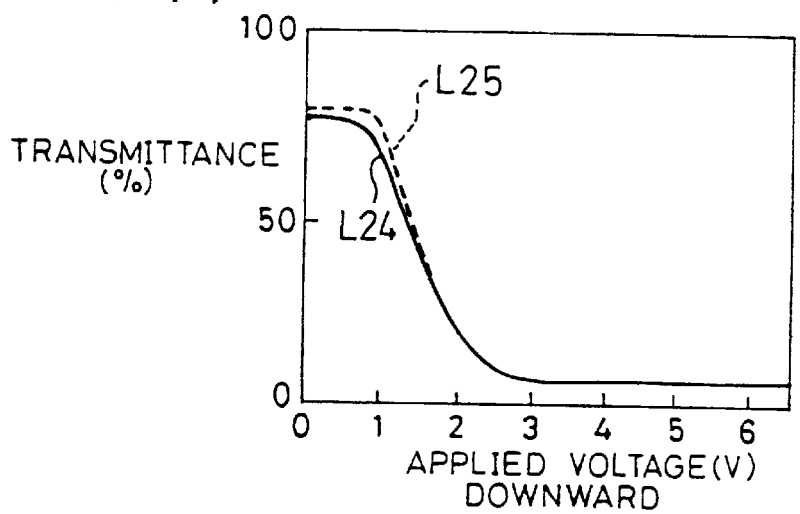
Figure 9C:
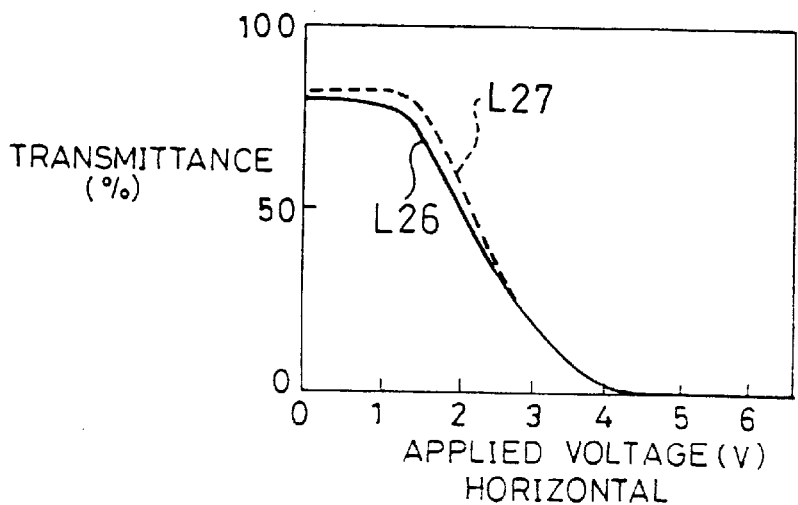

Graphs in FIGS. 9(a) to 9(c) show results, illustrating the behavior of the light transmittances of the samples #14 and #11, having respective pretilt angles of 8.0° and 2.0°, in response to voltage applied thereto, that is, the transmittance versus liquid crystal applied voltage characteristics.

Figure 5:
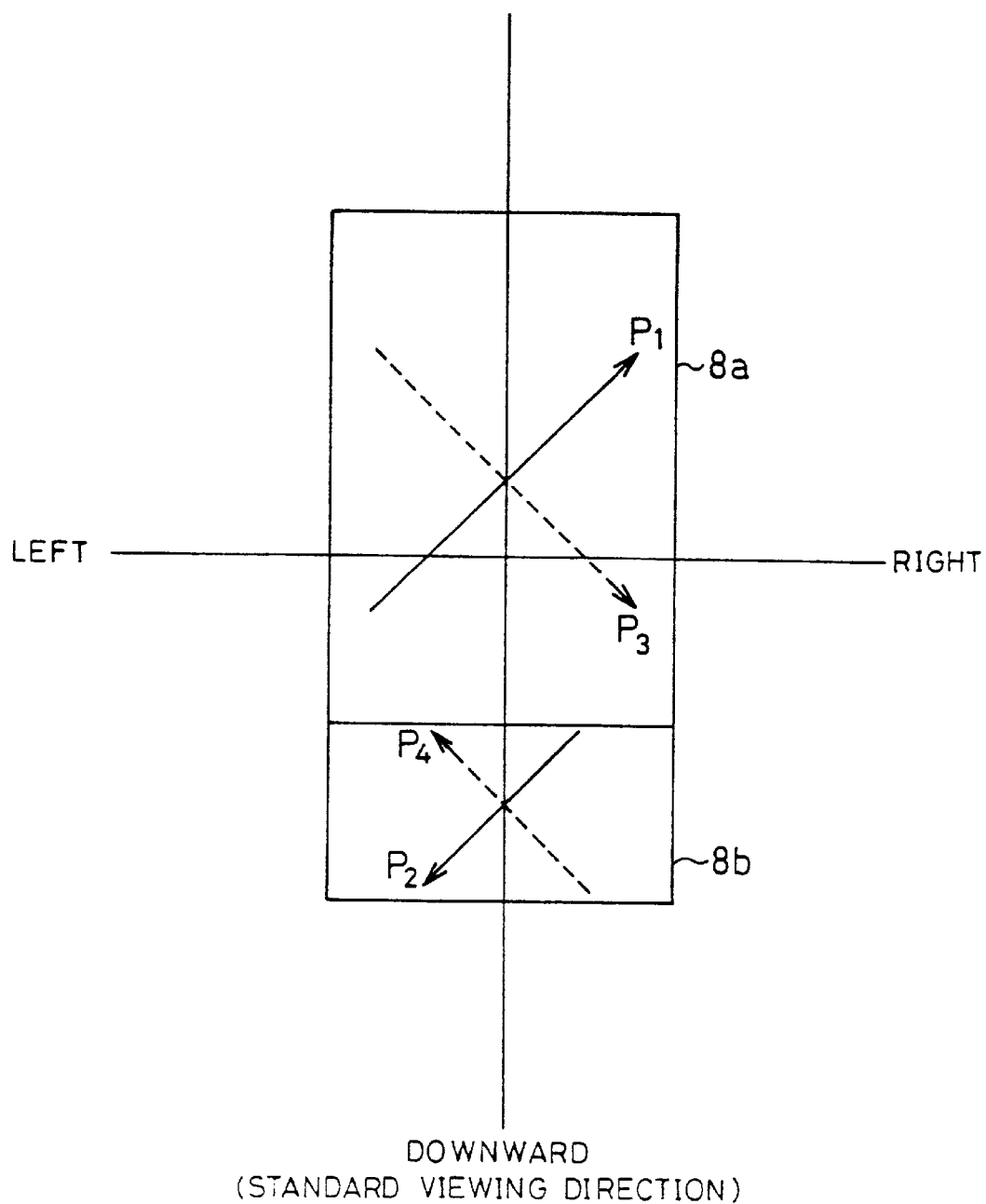
FIG. 5 is an explanatory drawing showing pretilt directions of liquid crystal molecules in a pixel of the liquid crystal display device.

FIG. 9(a) shows results of the measurement from the upward direction in FIG. 5. FIG. 9(b) shows results of the measurement from the downward direction in FIG. 5. FIG. 9(c) shows results of the measurement from the left-hand direction in FIG. 5. The same results as those shown in FIG. 9(c) were obtained from the measurement from the right-hand direction. Hereinafter, the right- and left-hand directions.

Referring to FIG. 9(a), the curved alternative long and short dash line L21 represents results of measurement in the front direction, i.e. the direction normal to the surface. Both the sample #11 and the sample #14 exhibit the same transmittance versus liquid crystal applied voltage characteristics.

Referring to FIGS. 9(a) to 9(c), the solid lines L22, L24, and L26 represent the sample #14, and the broken lines L23, L25, and L27 represent the sample #11.

To compare the sample #14 with the sample #11 in terms of transmittance versus liquid crystal applied voltage characteristics in the upward direction in FIG. 9(a), the curved line L23 for the sample #11 has a bumpy shape, or rise and fall of the transmittance, between about 1 V and 2 V. By contrast, the curved line L22 for the sample #14 is flat between about 1 V and 2 V with the transmittance staying at a value, and has no bumpy shape, showing that the sample #14 is free from the tone reversion phenomenon.

To compare those samples in terms of transmittance versus liquid crystal applied voltage characteristics in the downward, left-hand, and right-hand directions in FIGS. 9(b) and 9(c), the curved lines L24 and L26 for the sample #14 and the curved lines L25 and L27 for the sample #11 show that the transmittance of the sample #14 drops a little more quickly than that of the sample #11. However, the transmittance of the sample #14 starts to conform to that of the sample #11 at around 2 V in FIG. 9(b) and at around 2.7 V in FIG. 9(c). Therefore, it can be confirmed that the larger pretilt angle equalling 8.0° has no adverse effects.

The same results were obtained with samples prepared in the same manner as the samples #11 to #17 except that those samples each include optical retardation compensator plates 2 and 3 composed of discotic liquid crystal treated with hybrid orientation on a transparent support base.

Second Example

In the present example, three samples #21 to #23 were prepared by using Optomer AL (product name), available from Japan Synthetic Rubber Co., Ltd., as the orientation films 11 and 14 of the liquid crystal cell 16 of the liquid crystal display device shown in FIG. 1, using as the liquid crystal layer 8 (division ratio, 17:3) liquid crystal materials of which the pretilt angle is 6° and of which the refractive index anisotropies Δn(550) at a wavelength of 550 nm are 0.070, 0.080, and 0.095 respectively, and setting the thickness of the cells (of the liquid crystal layers 8) to 5 μm.

In the same manner as in the previous example, homogeneous cells were prepared by injecting thereinto the materials for the samples #21 to #23, and measured with a pretilt angle measuring device, NSMAP-3000LCD (Sigma Optical Machinery Co., Ltd.), for the pretilt angles of the samples #21 to #23.

Used as the optical retardation compensator plates 2 and 3 of the samples #21 to #23 are the optical retardation compensator plates 2 and 3 of the same kind as those in the first example above including discotic liquid crystal treated with an oblique orientation technique.

The samples #21 to #23 were placed in the measuring system shown in FIG. 6 to measure the output level by the light receiving element 21 in response to the applying of voltage to the samples #21 to #23 with the light receiving element 21 being fixed at a certain angle φ.

The measurement was done, assuming that the Y-direction is the left-hand side of the screen and the X-direction is the downward direction (standard viewing direction) of the screen, while disposing the light receiving element 21 in the upward direction (opposite viewing direction) and the right- and left-hand directions with the angle φ being maintained at 50°.

Figure 10A:
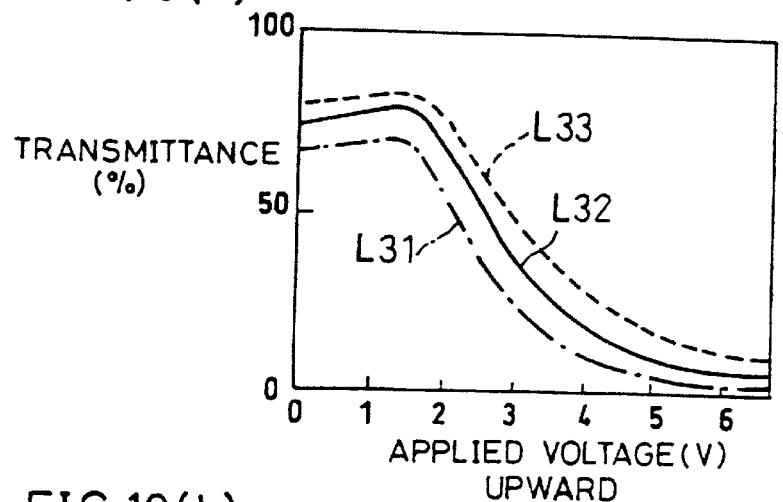
FIGS. 10(a), 10(b), and 10(c) are graphs showing the transmittance versus liquid crystal applied voltage characteristics of the liquid crystal display devices of the third example.
Figure 10B:
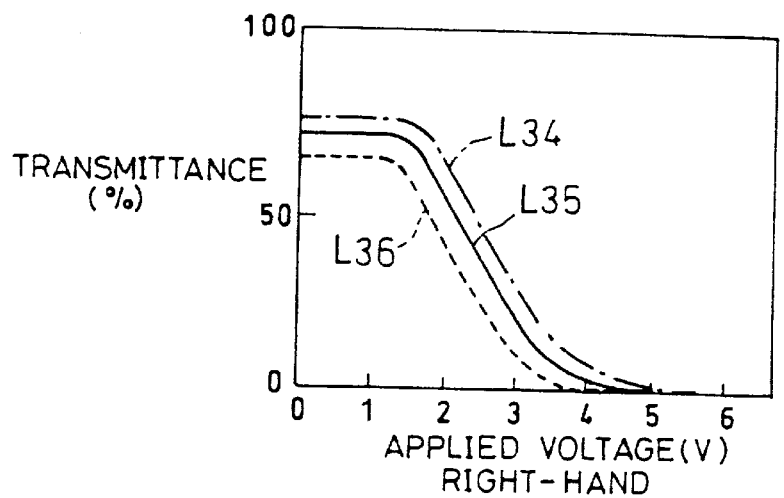
Figure 10C:
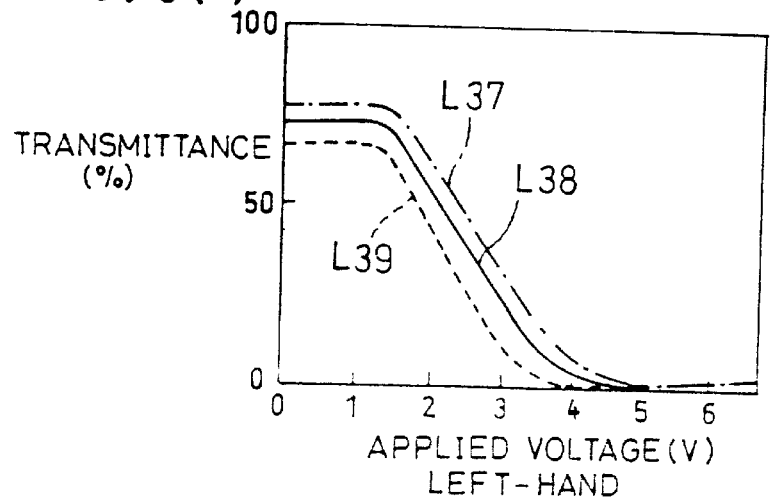

Graphs in FIGS. 10(a) to 10(c) show results, illustrating the behavior of light transmittance of the samples #21 to #23 in response to voltage applied thereto, that is, the transmittance versus liquid crystal applied voltage characteristics.

Referring to FIGS. 10(a) to 10(c), the curved alternative long and short dash lines L31, L34, and L37 represent the sample #21 using a liquid crystal material of Δn(550)=0.070 for the liquid crystal layer 8, the solid lines L32, L35, and L38 represent the sample #22 using a liquid crystal material of Δn(550)=0.080 for the liquid crystal layer 8, and the broken lines L33, L36, and L39 represent the sample #23 using a liquid crystal material of Δn(550)=0.095 for the liquid crystal layer 8.

Two comparative samples #201 and #202 were also prepared as a comparative example for the present example in the same manner as the samples of the present example except that those samples #201 and #202 use liquid crystal materials of which the refractive index anisotropies Δn(550) at a wavelength of 550 nm are 0.060 and 0.120 as the liquid crystal layer 8 (division ratio, 17:3) of the liquid crystal cell 16 shown in FIG. 1. The measuring system shown in FIG. 6 was used to measure the output level by the light receiving element 21 in response to the applying of voltage to the samples #201 and #202 with the light receiving element 21 being fixed at a certain angle φ in the same manner as in the present example.

The measurement was done, assuming that the Y-direction is the upward direction of the screen and the X-direction is the downward direction (standard viewing direction) of the screen, while disposing the light receiving element 21 in the upward direction and the right- and left-hand directions with the angle φ being maintained at 50°.

Figure 11A:
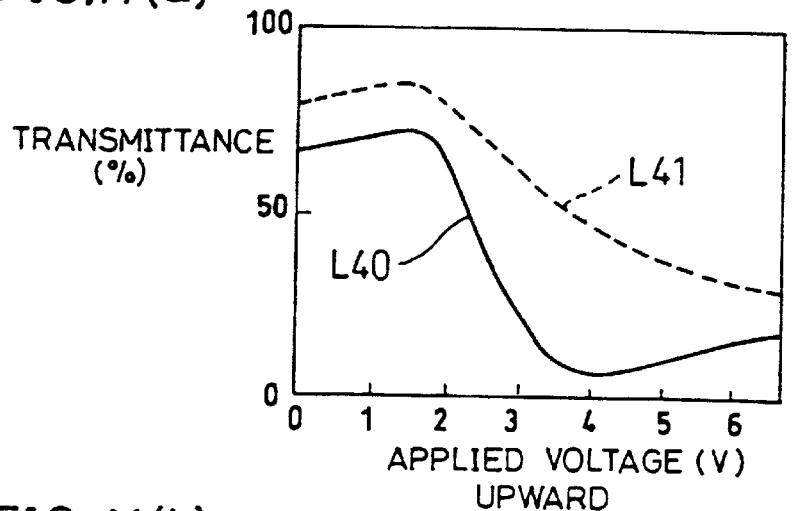
FIGS. 11(a), 11(b), and 11(c) are graphs showing the transmittance versus liquid crystal applied voltage characteristics of the liquid crystal display devices of a comparative example for the third example.
Figure 11B:
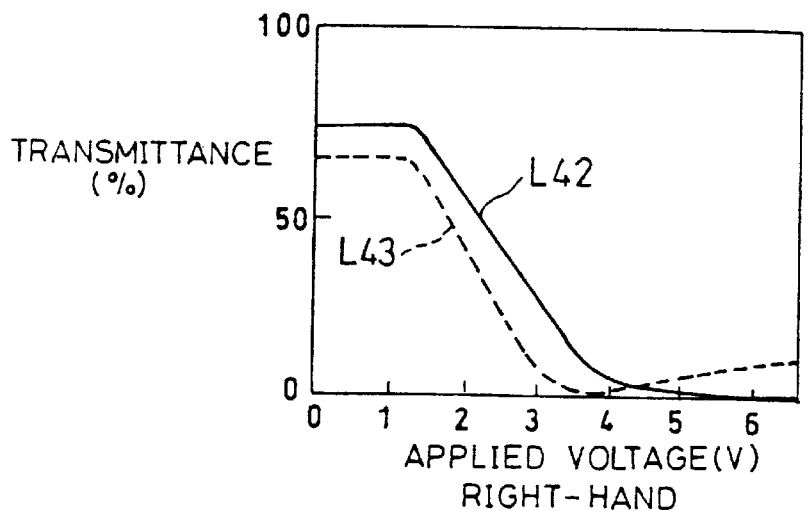
Figure 11C:
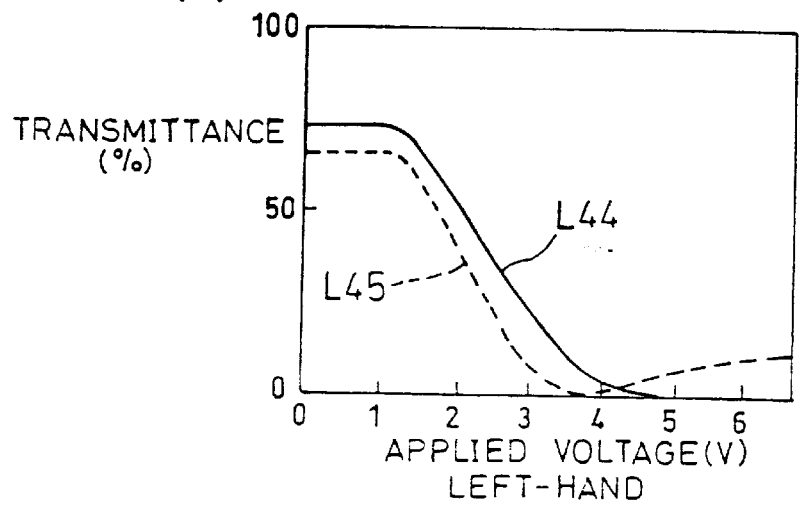
Figure 12:
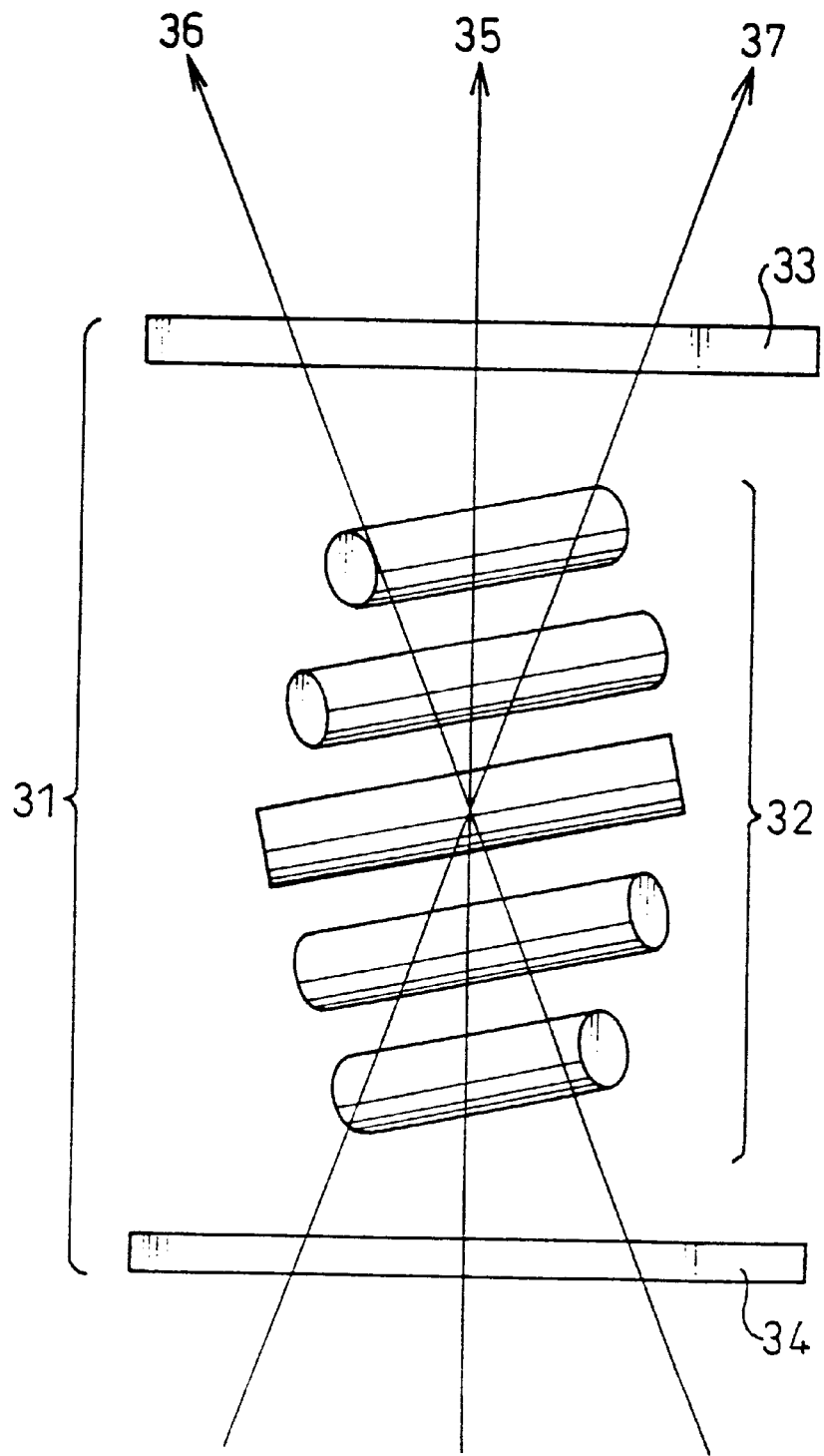
FIG. 12 is a schematic view showing the twisted orientation of liquid crystal molecules in an TN liquid crystal display element.

Graphs in FIGS. 11(a) to 11(c) show results, illustrating the behavior of light transmittance of the samples #201 to #202 in response to voltage applied thereto, that is, the transmittance versus liquid crystal applied voltage characteristics.

FIG. 11(a) shows results of the measurement from the upward direction in FIG. 5. FIG. 11(b) shows results of the measurement from the right-hand direction in FIG. 5. FIG. 11(c) shows results of the measurement from the left-hand direction in FIG. 5.

Referring to FIGS. 11(a) to 11(c), the solid curved lines L40, L42, and L44 represent the sample #201 using a liquid crystal material having Δn(550)=0.060 for the liquid crystal layer 8, and the broken curved lines L41, L43, and L45 represent the sample #202 using a liquid crystal material having Δn(550) of 0.120 for the liquid crystal layer 8.

To compare the samples #21 to #23 and the samples #201 and #202 in terms of transmittance versus liquid crystal applied voltage characteristics in the upward direction in FIGS. 10(a) and 11(a), the curved lines L31, L32, and L33 show that the transmittances drop by sufficient amounts with higher voltages. By contrast, in comparison with the curved lines L31, L32, and L33 in FIG. 10(a), the curved line L41 shows that the transmittance does not drop sufficiently with higher voltages, and the curved line L40 shows that the transmittance drops and then rises with higher voltages, resulting in tone reversion phenomenon.

To compare the samples #21 to #23 and the samples #201 and #202 in terms of transmittance versus liquid crystal applied voltage characteristics in the right-hand direction in FIGS. 10(b) and 11(b), the curved lines L34, L35, and L36 show that the transmittances drop almost to zero with higher voltages. The curved line L42 shows that the transmittance drops almost to zero with higher voltages as in FIG. 10(b), while the curved line L43 shows that tone reversion phenomenon occurs.

The same results as in the right-hand direction were obtained in the left-hand direction with the samples #21 to #23 and the samples #201 and #202: namely, the curved lines L37, L38, and L39 in FIG. 10(c) and the curved line in FIG. 11(c) show that the transmittances drop almost to zero with higher voltages, whilst the curved line L45 in FIG. 11(c) alone shows that tone reversion phenomenon occurs.

Visual observations were conducted of the samples #21 to #23 and the samples #201 and #202 under white light.

The samples #21 to #23 and the sample #201 showed coloration in no direction at a viewing angle of 50°, displaying good images. By contrast, the sample #202 showed coloration ranging from yellow to orange in the right- and left-hand directions at a viewing angle of 50°.

It can be concluded from those results shown in FIGS. 10(a) to 10(c) that if the liquid crystal layer 8 is made of a liquid crystal material of which the refractive index anisotropy $\Delta n(550)$ at a wavelength of 550 nm is 0.070, 0.080, or 0.095, the transmittance drops by a sufficient amount with higher voltages, thereby shows no tone reversion phenomenon, expanding the effective viewing angle, and shows no coloration phenomenon, greatly improving the display quality of the liquid crystal display device.

It can be concluded, on the other hand, from those results in FIGS. 11(a) to 11(c) that if the liquid crystal layer 8 is made of a liquid crystal material of which the refractive index anisotropy $\Delta n(550)$ at a wavelength of 550 nm is 0.060 or 0.120, the viewing angle dependency is not restrained satisfactorily.

The same results were obtained with samples prepared in the same manner as the samples #21 to #23 and the samples #201 and #202 except that those samples include optical retardation compensator plates 2 and 3 composed of discotic liquid crystal treated with hybrid orientation on a transparent support base.

The transmittance versus liquid crystal applied voltage characteristics were examined for the dependency thereof upon the inclination angle θ of the refractive index ellipsoid of the optical retardation compensator plates 2 and 3, by varying the inclination angle θ. The results were such that the transmittance versus liquid crystal applied voltage characteristics remained virtually unchanged irrelevant to the orientation state of the discotic liquid crystal of the optical retardation compensator plates 2 and 3, as long as the inclination angle θ stayed in the range of $15° \leq \theta \leq 75°$. It was also observed that when the inclination angle θ was varied out of that range, the effective viewing angle did not become wider in the opposite viewing direction.

The transmittance versus liquid crystal applied voltage characteristics were examined for the dependency thereof upon the second retardation value of the optical retardation compensator plates 2 and 3, by varying the second retardation value. The results were such that the transmittance versus liquid crystal applied voltage characteristics remained virtually unchanged irrelevant to the orientation state of the discotic liquid crystal of the optical retardation compensator plates 2 and 3, as long as the second retardation value stayed in the range of 80 nm to 250 nm. It was also observed that when the second retardation value was varied out of that range, the effective viewing angle did not become wider in the horizontal directions.

In light of the results of the visual observations of the comparative samples #201 and #202, three samples #24 to #26 were prepared in the same manner as in the present example except that the samples #24 to #26 used liquid crystal materials of which the refractive index anisotropies $\Delta n(550)$ at a wavelength of 550 nm are 0.065, 0.100, and 0.115 as the liquid crystal layer 8 of the liquid crystal cell 16 shown in FIG. 1. The measuring system shown in FIG. 6 was used to measure the output level by the light receiving element 21 in response to the applying of voltage to the samples #24 to #26 with the light receiving element 21 being fixed at a certain angle φ in the same manner as in the present example. Visual observations were also conducted of the samples #24 to #26 under white light.

The results show that the transmittance of the sample #25 with the refractive index anisotropy $\Delta n(550)$ of 0.100 and that of the sample #26 with the refractive index anisotropy $\Delta n(550)$ of 0.115 rose slightly with higher voltages in the right- and left-hand directions with the angle φ of 50°. However, no tone reversion phenomenon was visually confirmed, and those rises in the transmittances were within the extent that did not pose any problem for real use. The results show no problem at all in the upward direction.

Meanwhile, similarly to the transmittance of the aforementioned comparative sample #201 shown in FIG. 11(a), the transmittance of the sample #24 with the refractive index anisotropy $\Delta n(550)$ of 0.065 dropped slightly and then rose with higher voltages in the upward direction. However, the rise in the transmittance was relatively small as compared with that of the sample #201, being within the extent that did not pose any problem for real use. The results show no problem at all in the right- and left-hand directions.

Visual observation discovered slight coloration ranging from yellow to orange with the samples #25 and #26, however, within the extent that did not pose any problem for real use. Visual observation also discovered slight bluish coloration with the sample #24, however, also within the extent that did not pose any problem for real use.

As a supplement, the sample #24 and the comparative sample #201 were measured for transmittances when white tone was being displayed in the direction normal to the surface of the liquid crystal cell 16, by applying a voltage of about 1 V. The results show that the transmittance of the comparative sample #201 dropped to the extent unbearable for real use, while the transmittance of the sample #24 dropped slightly, however, within the extent that did not pose any problem for real use.

The same results were obtained in a case where Optomer AL (product name), available from Japan Synthetic Rubber Co., Ltd., was used as the orientation films 11 and 14 of the liquid crystal cell 16 of the liquid crystal display device shown in FIG. 1, and liquid crystal materials that formed pretilt angles of 4°, 8°, and 14° to the orientation films 11 and 14 were used as the liquid crystal layer 8.

As detailed above, the liquid crystal display device in accordance with the present invention is arranged to include:

a liquid crystal display element formed by sealing a 90°-twist-orientated liquid crystal layer between a pair of translucent substrates, each substrate having a transparent electrode layer and an orientation film on a surface thereof facing the other;

a pair of polarizers disposed so as to flank the liquid crystal display element; and at least one optical retardation compensator plate disposed between the liquid crystal display element and the polarizers, the optical retardation compensator plate having a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, and the liquid crystal display device is further arranged so that the orientation film divides the liquid crystal layer in each pixel into a plurality of divisions of mutually different volumes and orientates the divisions in mutually different directions and that the pretilt angle formed by the orientation films and the major axes of liquid crystal molecules in the liquid crystal layer is set within such a range that tone reversion does not occur in the opposite viewing direction when halftone is being displayed by applying to the liquid crystal a voltage that is close to the threshold voltage for the liquid crystal.

The liquid crystal display device in accordance with the present invention, including all the features of the arrangement above, is preferably further arranged so that the pretilt angle is further within such a range that luminance does not decrease abruptly in the standard viewing direction when halftone is being displayed by applying to the liquid crystal a voltage that is close to the threshold voltage for the liquid crystal.

Consequently, with the liquid crystal display devices in accordance with the present invention, it becomes possible to restrain change in phase difference of the liquid crystal display element better than only by the compensation function by the optical retardation compensator plate, especially, to eliminate the tone reversion in the opposite viewing direction on a screen displaying halftone by applying to the liquid crystal a voltage that is close to the threshold voltage for the liquid crystal, and thereby to further restrain the viewing angle dependency of the screen. Therefore, the liquid crystal display device including such an optical retardation compensator plate and a liquid crystal display element can prevent tone reversion phenomenon from occurring and the contrast ratio in the opposite viewing direction from decreasing.

In addition, the compensation effect by the unequally divided liquid crystal layer eliminates the difference in the contradictory viewing angle characteristics between the standard viewing angle and the opposite viewing angle, modifying the two kinds of viewing angle characteristics to be similar to each other. It thereby becomes possible to substantially uniformly restrain the decrease in contrast and the chances of whitish images displayed which occur when the viewing angle increases in the standard or opposite viewing direction.

Specifically, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the pretilt angle in each orientation segment of the divided liquid crystal layer on at least one of the substrates within a range larger than 4° and smaller than 15°.

Therefore the liquid crystal display device in accordance with the present invention, including all the features of the arrangement above, is preferably further arranged so that the pretilt angle is set within a range larger than 4° and smaller than 15° in each orientation segment of the divided liquid crystal layer on at least one of the substrates.

With this arrangement, although in some instances still incapable of completely eliminating tone reversion in the opposite viewing direction, the setting can restrain the tone reversion phenomenon on the liquid crystal screen to the extent that the liquid crystal screen can be viewed from any direction without serious problems for real use at the viewing angle of 50°, which is the viewing angle typically required for liquid crystal display devices.

For a case of liquid crystal display devices with wider viewing angles such as 70°, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the pretilt angle within a range not smaller than 6° and not larger than 14°.

Therefore the liquid crystal display device in accordance with the present invention, including all the features of the arrangement above, is preferably further arranged so that the pretilt angle is set within a range not smaller than 6° and not larger than 14°.

According to this arrangement, it becomes possible with liquid crystal display devices with wider viewing angles such as 70° to completely eliminate the tone reversion in the opposite viewing direction on a screen displaying halftone by applying to the liquid crystal a voltage that is close to the threshold voltage for the liquid crystal.

For these reasons, with the arrangement, the quality of images displayed by the liquid crystal display device is greatly improved in comparison with conventional liquid crystal display devices.

Another liquid crystal display device in accordance with the present invention is arranged to include:

a liquid crystal display element formed by sealing a 90°-twist-orientated liquid crystal layer between a pair of translucent substrates, each substrate having a transparent electrode layer and an orientation film on a surface thereof facing the other;

a pair of polarizers disposed so as to flank the liquid crystal display element; and at least one optical retardation compensator plate disposed between the liquid crystal display element and the polarizers, the optical retardation compensator plate having a refractive index ellipsoid having three principal refractive indices, na, nb, and nc, mutually related by the inequality na=nc>nb, the refractive index ellipsoid inclining as the direction of the principal refractive index nb parallel to the normal to the surface and the direction of either the principal refractive index na or nc in the surface recline either clockwise or counterclockwise around the direction of the principal refractive index nc or na in the surface, and the liquid crystal display device is further arranged so that the orientation film divides the liquid crystal layer in each pixel into a plurality of divisions of mutually different volumes and orientates the divisions in mutually different directions and that the value of applied voltage for displaying halftone obtained by applying to the liquid crystal a voltage that is close to the threshold voltage for the liquid crystal is set within such a range that tone reversion does not occur in the opposite viewing direction when halftone is being displayed.

Moreover, the liquid crystal display device in accordance with the present invention, including all the features of the arrangement above, is preferably further arranged so that the value of applied voltage for displaying halftone obtained by applying to the liquid crystal a voltage that is close to the threshold voltage for the liquid crystal is set within such a range that luminance does not decrease abruptly in the standard viewing direction when halftone is being displayed.

Consequently, with the liquid crystal display devices of the above arrangement in accordance with the present invention, it is possible to restrain change in phase difference of the liquid crystal display element better than only by the compensation function by the optical retardation compensator plate, especially, to eliminate the tone reversion in the opposite viewing direction on a screen displaying halftone by applying to the liquid crystal a voltage that is close to the threshold voltage for the liquid crystal, and thereby to further restrain the viewing angle dependency of the screen. Therefore, the liquid crystal display device including such an optical retardation compensator plate and a liquid crystal display element can prevent tone reversion phenomenon from occurring and the contrast ratio in the opposite viewing direction from decreasing.

In addition, the compensation effect by the unequally divided liquid crystal layer eliminates the difference in the contradictory viewing angle characteristics between the standard viewing angle and the opposite viewing angle, modifying the two kinds of viewing angle characteristics to be similar to each other. It thereby becomes possible to substantially uniformly restrain the decrease in contrast and the chances of whitish images displayed which occur when the viewing angle increases in the standard or opposite viewing direction.

Specifically, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the value of applied voltage for displaying halftone obtained by applying to the liquid crystal a voltage that is close to the threshold voltage for the liquid crystal so as to obtain a transmittance higher than 85% that in a bright state (OFF state) where no voltage is applied to the liquid crystal.

Therefore, the liquid crystal display device in accordance with the present invention, including all the features of the arrangement above, is preferably arranged so that the value of applied voltage for displaying halftone obtained by applying to the liquid crystal a voltage that is close to the threshold voltage for the liquid crystal is set to obtain a transmittance higher than 85% that in a bright state where no voltage is applied to the liquid crystal.

With this arrangement, although in some instances still incapable of completely eliminating tone reversion in the opposite viewing direction, the setting can restrain the tone reversion phenomenon on the liquid crystal screen to the extent that the liquid crystal screen can be viewed from any direction without serious problems for real use at the viewing angle of 50°, which is the viewing angle typically required for liquid crystal display devices.

For a case of liquid crystal display devices with wider viewing angles such as 70°, the range that does not cause tone reversion in the opposite viewing direction when halftone is being displayed by applying to the liquid crystal a voltage that is close to the threshold voltage for the liquid crystal, and that does not cause an abrupt decrease in luminance in the standard viewing direction when halftone is being displayed refers to the setting of the value of applied voltage for displaying halftone obtained by applying to the liquid crystal a voltage that is close to the threshold voltage for the liquid crystal so as to obtain a transmittance within a range not less than 90% and not more than 97% that in a bright state (OFF state) where no voltage is applied to the liquid crystal.

Therefore, the liquid crystal display device in accordance with the present invention, including all the features of the arrangement above, is preferably arranged so that the value of applied voltage for displaying halftone obtained by applying to the liquid crystal a voltage that is close to the threshold voltage for the liquid crystal is set to obtain a transmittance within a range not less than 90% and not more than 97% that in a bright state where no voltage is applied to the liquid crystal.

According to the arrangement it becomes possible with liquid crystal display devices with wider viewing angles such as 70° to completely eliminate the tone reversion in the opposite viewing direction on a screen displaying halftone by applying to the liquid crystal a voltage that is close to the threshold voltage for the liquid crystal.

For these reasons, with the arrangement, the quality of images displayed by the liquid crystal display device is greatly improved in comparison with conventional liquid crystal display devices.

The liquid crystal display device in accordance with the present invention, including all the features of the arrangement above, is preferably further arranged so that the refractive index anisotropy, $\Delta n(550)$, of the liquid crystal material for the liquid crystal layer to light having a wavelength of 550 nm is set within a range larger than 0.060 and smaller than 0.120.

This is because of a confirmation that if the refractive index anisotropy, $\Delta n(550)$, of the liquid crystal material to light having a wavelength of 550 nm, which is approximately the mid-range of the visible region of the spectrum, is either not larger than 0.060 or not smaller than 0.120, tone reversion phenomenon and/or a decrease in contrast ratio occur(s) depending upon the viewing direction. Therefore, the phase difference that occurs to the liquid crystal display element in accordance with the viewing angle can be eliminated by setting the refractive index anisotropy, $\Delta n(550)$, of the liquid crystal material to light having a wavelength of 550 nm so as to be within a range larger than 0.060 and smaller than 0.120. This can further restrain the contrast variations and tone reversion phenomenon in the right- and left-hand directions, as well as the coloration phenomenon that occurs depending upon the viewing angle.

For these reasons, by employing the arrangement to set the refractive index anisotropy $\Delta n(550)$ within a range larger than 0.060 and smaller than 0.120, the quality of images displayed by the liquid crystal display device above in accordance with the present invention is further improved.

In such an event the phase difference that occurs to the liquid crystal display element in accordance with the viewing angle can be more effectively eliminated by setting the refractive index anisotropy, $\Delta n(550)$, of the liquid crystal material for the liquid crystal layer to light having a wavelength of 550 nm so as to be within a range not smaller than 0.070 and not larger than 0.095. This can surely restrain the contrast variations, coloration phenomenon, and tone reversion phenomenon in the right- and left-hand directions of the images displayed by the liquid crystal display device according to the viewing angle.

Moreover, the liquid crystal display device of the above arrangement in accordance with the invention, is preferably arranged so that the or each optical retardation compensator plate has a refractive index ellipsoid inclining by an inclination angle set within a range of 15° to 75°.

By setting the inclination angle of the refractive index ellipsoid to be within a range of 15° to 75° with respect to the or each optical retardation compensator plate incorporated in the liquid crystal display device, it is assured that the present invention provides the aforementioned compensation function for the phase difference by the optical retardation compensator plate. Therefore, the visibility of the liquid crystal display device of the above arrangement in accordance with the present invention can be surely improved.

Moreover, the liquid crystal display device of the above arrangement in accordance with the invention, is preferably arranged so that the or each optical retardation compensator plate has a product, $(n_a-n_b) \times d$, of the difference between the principal refractive indices, na and nb, and the thickness, d, of the optical retardation compensator plate, the product being set to be from 80 nm to 250 nm.

By setting the product, $(n_a-n_b) \times d$, of the difference between the principal refractive indices, na and nb, and the thickness, d, of the optical retardation compensator plate, so as to be from 80 nm to 250 nm with respect to the or each optical retardation compensator plate incorporated in the liquid crystal display device, it is assured that the present invention provides the aforementioned compensation function for the phase difference by the optical retardation compensator plate. Therefore, the visibility of the liquid crystal display device of the above arrangement in accordance with the present invention can be surely improved.

Moreover, as described earlier, the liquid crystal display device in accordance with the present invention is preferably further arranged so that the optical retardation compensator plate is placed so that in the largest divided liquid crystal layer in each pixel, the direction of the inclination of the refractive index ellipsoid is opposite to the direction of the inclination of the liquid crystal molecules in a vicinity of the inner side of the orientation film when a voltage is applied to the liquid crystal molecules by the transparent electrodes.

With the arrangement, if the direction of the inclination of the refractive index ellipsoid to the surface of the optical retardation compensator plate is opposite in the largest divided liquid crystal layer to the direction of the inclination of the liquid crystal molecules when a voltage is applied to the liquid crystal molecules, the optical properties by the liquid crystal molecules and those of the refractive index ellipsoid, i.e. the optical retardation compensator plate are set to be opposite to each other. Therefore, although the liquid crystal molecules in the vicinity of the inner surface of the orientation film do not stand up on the application of voltage due to the effect of the orientation, the optical retardation compensator plate can compensate for the imbalance of the optical properties caused by the liquid crystal molecules.

Consequently, it becomes possible to restrain the reversion phenomenon when the viewing angle increases in the standard viewing direction, and hence to display good images free from indecipherable darkness. Also, it becomes possible to restrain the decrease in contrast when the viewing angle increases in the opposite viewing direction, and hence to display good images free from whiteness. It also becomes possible to restrain the reversion phenomenon in the right- and left-hand directions.

For these reasons, with the arrangement, the viewing angle characteristics of the liquid crystal display device in accordance with the present invention is greatly improved.

Moreover, as described earlier, the liquid crystal display device in accordance with the present invention is preferably further arranged so that a first divided liquid crystal layer and a second divided liquid crystal layer are provided as the divided liquid crystal layer, and the ratio of the volumes of the first and second divided liquid crystal layers is set in a range from 6:4 to 19:1.

Hence, the viewing angle characteristics are more surely improved by the arrangement of specifying the inclination direction of the refractive index ellipsoid.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display device, comprising:

a liquid crystal display element formed by sealing a liquid crystal layer between a pair of substrates each of which has an orientation film;

a pair of polarizers disposed so as to flank the liquid crystal display element; and at least one optical retardation compensator plate disposed between the liquid crystal display element and the polarizers, the optical retardation compensator plate having an inclining refractive index ellipsoid, wherein the orientation films orient the liquid crystal layer in each pixel such that it is divided into a plurality of divisions of mutually different volumes whose orientation directions are mutually different, and a pretilt angle formed by the orientation films and a major axis of liquid crystal molecules in the liquid crystal layer is set within a range that results in halftone being displayed without tone reversion in a viewing direction opposite to a standard viewing direction with respect to a line normal to the display.

2. The liquid crystal display device as defined in claim 1, wherein the refractive index ellipsoid has three principal refractive indices, na, nb, and nc, mutually related by the inequality na=nc>nb, and inclines as the direction of the principal refractive index nb parallel to the normal to a surface of the optical retardation compensator plate inclines either clockwise or counterclockwise from the normal to the surface around the direction of the principal refractive index na or nc in the surface.

3. The liquid crystal display device as defined in claim 1, wherein the optical retardation compensator plate contains a support base constituted by a transparent organic polymer on which discotic liquid crystal is orientated with an oblique or hybrid orientation technique and crosslinked.

4. The liquid crystal display device as defined in claim 1, wherein the orientation film divides the liquid crystal layer in each pixel into two divisions of mutually different volumes and imparts mutually different pretilt directions to the divisions.

5. The liquid crystal display device is defined in claim 1, wherein the pretilt angle is set such that at the upper end of said range the halftone is displayed without abrupt decrease of luminance in a standard viewing direction.

6. The liquid crystal display device as defined in claim 5, the pretilt angle is set within a range larger than 4° and smaller than 15°.

7. The liquid crystal display device as defined in claim 6, wherein the pretilt angle is set within a range not smaller than 6° and not larger than 14°.

* * * * *